(12) United States Patent
Budka et al.

(10) Patent No.: US 6,856,812 B1
(45) Date of Patent: Feb. 15, 2005

(54) DOWNLINK POWER CONTROL METHOD FOR WIRELESS PACKET DATA NETWORK

(75) Inventors: Kenneth Budka, Marlboro, NJ (US); Kamala Murti, Morganville, NJ (US); Arnab Das, Old Bridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 378 days.

(21) Appl. No.: 09/610,097

(22) Filed: Jun. 30, 2000

(51) Int. Cl.[7] .............................. H04Q 7/20; H04B 7/00
(52) U.S. Cl. ..................... 455/522; 455/127.1; 370/318
(58) Field of Search .......................... 455/522, 10, 13.4, 455/63.1, 69, 127.1, 226.2, 442, 436, 437, 232.1, 241.1, 249.1, 247.1; 370/318, 332

(56) References Cited

U.S. PATENT DOCUMENTS

| | | | | |
|---|---|---|---|---|
| 5,483,669 A | * | 1/1996 | Barnett et al. | 455/437 |
| 5,995,496 A | * | 11/1999 | Honkasalo et al. | 370/318 |
| 6,334,047 B1 | * | 12/2001 | Andersson et al. | 455/69 |
| 6,456,605 B1 | * | 9/2002 | Laakso et al. | 370/330 |
| 6,498,925 B1 | * | 12/2002 | Tauchi | 455/115.1 |
| 6,741,866 B1 | * | 5/2004 | Gustavsson | 455/522 |

* cited by examiner

Primary Examiner—William Trost
Assistant Examiner—Brandon J. Miller

(57) ABSTRACT

In a system having a base station transmitter for transmitting data blocks to one or more mobile stations over a radio link, a method for determining a transmit power level at which to transmit a current block. A quality measurement is received from a mobile station indicating an average radio link quality over a previous group of blocks, wherein not all of the blocks of the previous group of blocks were necessarily transmitted at the same transmit power level. A transmit power attenuation level is determined for the current block based on the quality measurement. The transmit power attenuation level is subtracted from the initial transmit power level to determine the transmit power level for the current block.

25 Claims, 13 Drawing Sheets

FIG. 10 1000

DOWNLINK POWER CONTROL METHOD FOR WIRELESS PACKET DATA NETWORK

BACKGROUND OF THE INVENTION

1. Field of the Invention

The present invention relates to wireless communications and, in particular, to a technique for determining downlink power used for transmissions from a base station of a system such as the general packet radio service (GPRS) system to one or more mobile stations of the system.

2. Description of the Related Art

A variety of wireless communications systems are increasingly being employed. In cellular systems, for example, a network of base transceiver stations (BTSs) are used to provide wireless links with mobile stations or units (e.g., cell phones). The mobile stations, sometimes referred to simply as mobiles, typically communicate via either analog or digital modulated radio frequency (RF) signals with the base station, which is itself connected to an external telephone or data network.

A variety of digital cellular networks and telecommunications standards are in use, such as GSM (Global System for Mobile Communication), and GSM derivatives (e.g., DCS 1800, PCS 1900, etc.). GPRS is an emerging standard that adds general Internet Protocol (IP) data communication, such as high-speed Internet and email data services, to GSM networks. GPRS uses a packet-mode technique to transfer high-speed and low-speed data and signaling in an efficient manner over GSM radio networks. The packet radio principle of GPRS can be used for carrying end user's packet data protocol (such as EP and X.25) information from/to a GPRS terminals to/from other GPRS terminals and/or external packet data networks. GPRS is defined by various ETSI (European Telecommunications Standards Institute) specifications such as ETSI GSM 05.08 version 6.5.0 Release 1997, "Digital cellular telecommunications system (Phase 2+); Radio subsystem link control"; and ETSI GSM 04.60 version 6.4.0 Release 1997, "Digital cellular telecommunications system (Phase 2+); General Packet Radio Service (GPRS); Mobile Station (MS)—Base Station System (BSS) interface; Radio Link Control/Medium Access Control (RLC/MAC) protocol." See <http://www.etsi.org/>.

GPRS uses a time division multiple access (TDMA) scheme. In a TDMA scheme, over a given RF channel, each mobile station in a cell transmits and receives (to and from the base station) audio data and non-audio data packets during dedicated time slices or time slots within an overall TDMA cycle or epoch. Other communications schemes include frequency division multiple access (FDMA), code division multiple access (CDMA), and combinations of such schemes. In GPRS, the allocation of GPRS radio channels is flexible: from 1 to 8 radio interface timeslots can be allocated per TDMA frame. Timeslots are shared by the active users, and uplink and downlink timeslots are allocated separately, where downlink refers to transmissions from BTS to one or more mobile stations, while uplink refers to transmissions received by the BTS. The radio interface resources can be shared dynamically between speech and data services as a function of service load and operator preference. Various radio channel coding schemes are specified to allow bitrates from 9 to more than 150 kbit/s per user.

In GPRS systems, timeslots are further subdivided into blocks. For example, one block of data is transmitted by a base station on a timeslot every 20 ms. These data blocks, sometimes referred to as RLC/MAC blocks, contain a number of bits of data (e.g., 456 physical layer bits). A block can be intended for a particular mobile station. In addition, each block contains a header containing control information called the uplink state flag which must be decoded by all mobiles in the cell of the BTS which are sending data uplink.

To exploit the wide range of carrier-to-interference (C/I) ratios available at different locations within a cell, GPRS networks employ four different airlink coding schemes. GPRS's lowest rate code, CS-1, employs a relatively high number of redundancy bits and offers a maximum LLC-layer throughput of 8 kbps/timeslot. The high level of redundancy present in blocks encoded using CS-1 ensures that mobile stations at the fringes of a cell, where C/I levels are typically lowest, are able to send and receive data. In contrast, the highest rate code, CS-4, offers maximum LLC-layer throughputs of 20 kbps/timeslot. Because of the small number of redundancy bits added to each block encoded with CS-4, however, airlink errors can be detected, but not corrected. As a result, CS-4 offers the best airlink performance at relatively high C/I ratios. The remaining two GPRS coding schemes offer maximum LLC-layer throughputs of 12 kbps/timeslot (CS-2) and 14.4 kbps/timeslot (CS-3).

By monitoring the quality of the airlink, mobile stations and the GPRS network can select the coding scheme that offers the best performance. The process of dynamically selecting the coding scheme based on airlink quality is called link adaptation. Quality can be measured, for example, by measuring the bit error rate (BER) or block error rate (BLER) of the channel.

Dynamic power control is an important tool for mitigating co-channel interference in wireless networks. In GPRS networks, keeping co-channel interference levels low holds the promise that high rate coding schemes can be used over the airlink. The lower interference levels achieved by power control can result in higher airlink throughputs over larger portions of the cell, potentially increasing a cell's data traffic carrying capacity. Effective GPRS power control also ensures that timeslots used for GPRS do not cause unacceptable levels of interference to timeslots used for voice calls in co-channel neighbor cells.

Circuit-switched (e.g., voice) GSM and GPRS use airlink resources in dramatically different ways. Circuit-switched GSM mobile stations have dedicated use of a single timeslot (or half a timeslot, for halfrate users) for the entire duration of a call-periods of time that typically last tens of seconds to minutes. Circuit-switched GSM mobile stations report channel quality measurements roughly twice a second. In contrast, GPRS users share a single timeslot simultaneously with several users in a cell. A single user may transmit and receive GPRS data over multiple timeslots simultaneously. GPRS radio link connections, known as temporary block flows (TBFs), can be short-lived, lasting less than a few hundred milliseconds. GPRS mobile stations report downlink airlink quality measurements in RLC/MAC acknowledgement messages, typically in response to being polled by the base station setting a poll bit in a downlink block. Since the GPRS network is free to poll for these acknowledgement messages at will, airlink quality measurement reports sent by GPRS users will tend to be more sporadic than in circuit-switched GSM networks.

Power control "mistakes" in Circuit-switched GSM and GPRS have different consequences. Inadequate power control for circuit-switched calls can lead to dropped calls, service disruptions which are extremely annoying for users and network operators alike. Inadequate power control for GPRS mobile stations can cause high BLERs, or, at worst, broken TBFs. Power control errors in GPRS networks increase packet delays and decrease user throughputs, thus causing service degradation rather than wholesale service disruption.

GPRS's uplink power control mechanisms allow the network to tune the uplink transmit power used by each mobile station transmitting uplink RLC/MAC blocks. Uplink power control provides an important added benefit: transmit power used by each GPRS mobile station can be reduced to levels adequate to achieve proper airlink performance, and no higher. Transmit power can be kept as low as possible without sacrificing airlink throughput, giving users peak airlink performance without unnecessarily draining the mobile station's battery.

In general, the GPRS standards specify various downlink power level requirements that must be met. The GPRS power control framework is provided in the ETSI GPRS 05.08 system specification referenced above, and specifies GPRS's downlink power control mechanisms and the constraints governing downlink power control. These requirements specify, for example, the maximum permitted power level, the minimum permitted power level, and the intermediate power levels. For example, a given GPRS system may specify that a downlink block must be transmitted at a power level no greater than a maximum wattage, and at a power level no lower than 10 dB lower than the maximum, and 2 dB increments between. The transmission has to be "loud" (powerful) enough to be received by the intended mobile station, with acceptable quality (BER); moreover, all blocks having header information intended for broadcast to all mobile stations in the cell must be loud enough to be received by all mobile stations of the cell, even those at the remote fringe of the cell.

While it is not as important to conserve power in the downlink transmissions, it is nevertheless desirable to reduce the downlink power as much as possible, while achieving acceptable airlink quality, so as to reduce co-channel interference. In conventional GPRS systems, a group of blocks, e.g. 10 blocks, are transmitted at a given power level. The base station typically polls a given mobile station having an active link at the end of the group of blocks (i.e., every measurement or reporting interval), to determine the airlink quality. The power level for the next group of blocks can then be adjusted, based on the BER measured at the prior power level, in an attempt to reduce power as much as possible while achieving an acceptable BER.

SUMMARY

In the present invention, in which a system has a base station transmitter for transmitting data blocks to one or more mobile stations over a radio link, a method is provided for determining a transmit power level at which to transmit a current block. A quality measurement is received from a mobile station indicating an average radio link quality over a previous group of blocks, wherein not all of the blocks of the previous group of blocks were necessarily transmitted at the same transmit power level. A transmit power attenuation level is determined for the current block based on the quality measurement. The transmit power attenuation level is subtracted from the initial transmit power level to determine the transmit power level for the current block.

DESCRIPTION OF THE PREFERRED EMBODIMENT

In the present invention, a GPRS downlink power control method or algorithm is provided to control the power used for downlink transmissions of each block. The GPRS downlink power control method of the present invention operates, in a preferred embodiment, within the GPRS power control framework outlined in the ETSI GPRS 05.08 system specification, described above. In an embodiment, a group of blocks is transmitted between polling or measurement intervals. The last block polls the mobile station for airlink quality. This airlink quality measurement reported by the mobile is an average of the airlink quality of a previous group of blocks. Each block of a group of blocks is transmitted at a potentially different power level, however. The downlink power control method of the present invention determines an initial or baseline power transmission level for blocks of the next group of block, and a potentially different power level for each block of the group of blocks, based on the average downlink quality of the previous group of blocks. These and other details, advantages, and embodiments of the present invention are described in further detail below with respect to FIGS. 1–13.

Figure 1:
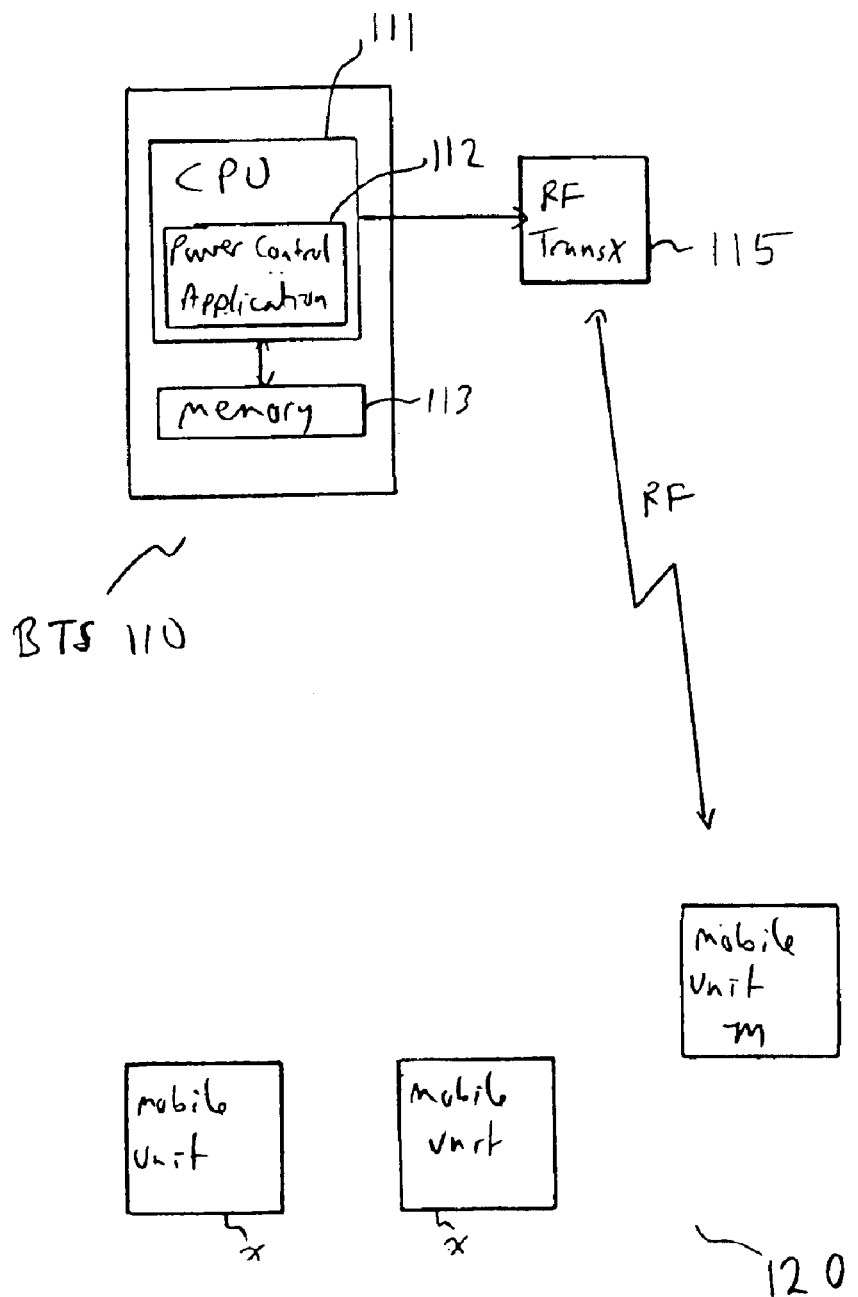
FIG. 1 is a block diagram of a wireless communications system in accordance with an embodiment of the present invention.

Referring now to FIG. 1, there is shown a block diagram of a wireless communications system 100 in accordance with an embodiment of the present invention. System 100 may be a cellular portion of a GPRS system, for example, and comprises base transceiver station (BTS) 110 and a plurality of mobile stations or units 120. Mobile stations 120 include a particular mobile station m and other mobile stations x. BTS 110 includes an RF transceiver (transmitter/receiver) 115 coupled to a computer having CPU 111 and memory 113. CPU 111 runs a power control application 112 in accordance with the present invention, which determines the transmit power to be used before transmitting each downlink block by the transmitter of transceiver 115. CPU 111 also runs a suitable RLC/MAC application (not shown) which segments packets received from an external network into downlink blocks, and also reassembles packets from uplink blocks received from mobile stations.

As described in further detail below, the transmit power is set as low as possible, but high enough so that any destination mobile m will be able to successfully decode the block with acceptable BER, and so that any other mobiles in the cell of the BTS which are sending data uplink can successfully decode the uplink state flag of the block with an acceptable error rate.

As also described below, power control application 112 causes the last block of a group of blocks to poll mobile unit m for the average downlink quality of the last group of blocks. Application 112 then adjusts the power level used by transceiver 115 for every subsequent block of the next group of blocks, based in part on the average quality measurement for the previous group of blocks, and based in part on the target BER, the previous target and actual BER and power levels used, and the type of block (i.e., whether a particular block transmitted only to mobile station or unit m or a broadcast block).

Terms, Acronyms, and Abbreviations

Below are listed various terms, acronyms, and abbreviations employed in this application.

| | |
|---|---|
| Ack | Acknowledgment |
| AGC | Automatic Gain Control |
| BCCH | Broadcast Common Control Channel |
| BER | Bit Error Rate |
| BLER | Block Error Rate |
| BTS | Base Transceiver Station |
| C/I | Carrier to Interference ratio |
| CS-x | Coding Scheme-x (x = 1, . . . ,4) |
| dB | Decibels |
| downlink | The base station-to-mobile station communications channel |
| FH | Frequency Hopping |
| GPRS | General Packet Radio Service |
| GSM | Global System for Mobile Communication |
| kbps | Kilobits per second |
| LLC | Logical Link Control |
| MAC | Medium Access Control |
| MS | Mobile Station |
| Nack | Negative acknowledgement |
| PACCH | Packet Associated Control Channel |
| PDCH | Packet Data Channel |
| PTCH | Packet Timing Channel |
| RA | Rural Area |
| RLC | Radio Link Control |
| TBF | Temporary Block Flow |
| TDMA | Time Division Multiple Access |
| TU | Typical Urban |
| uplink | The mobile station-base station communications channel |
| USF | Uplink State Flag |

Downlink Power Control in GPRS Networks

GPRS networks have a number of provisions to help the network control downlink transmit power levels:

During packet transfer mode, mobile stations 120 (e.g., m, x) make fairly detailed measurements of path loss, signal variance, channel error rates, and interference power levels, to measure airlink (downlink) quality. Mobile stations report channel quality measurements in each Packet Downlink Ack/Nack message and Packet Resource Request Message.

The base transceiver station (BTS) can select the power used to transmit each downlink block. BTS power is controlled in 2 dB increments.

The network may send a mobile station m an "extended measurement order," all requesting the mobile station to make additional RF quality measurements.

The following sections outline the quality measurements made by the mobile stations and describe constraints that must be adhered to by a downlink power control algorithm for systems using dynamic or extended dynamic resource allocation mode.

Downlink Channel Quality Measurements

During packet transfer mode, the mobile station (e.g., m) assesses downlink channel quality. Detailed descriptions of downlink channel quality measurements are described in the ETSI GPRS 05.08 specification referenced above. The format of the Packet Downlink Ack/Nack and Packet Resource Request messages, the PDUs used to transfer downlink quality measurements to the network, is described in the ETSI GSM 04.60 specification referenced above.

Table 1 below summarizes the channel quality measurements reported by the mobile station in each Packet Downlink Ack/Nack message (and Packet Resource Request message):

TABLE 1

Summary of downlink quality measurements reported by Mobile Stations

| Reported Value | Description |
|---|---|
| C_VALUE | 6-bit long binary encoding of "C", the estimated normalized received signal level of the BCCH. The value is expressed in dBm. The range is [0,63] dBm. |
| RXQUAL_i (i = 0, . . . ,7) | When CS-1, CS-2, or CS-3 are used on the downlink, mobile stations report one of eight possible values specifying the estimated BER of the downlink channel. The BER estimate is calculated over successfully decoded blocks received during the reporting interval. RXQUAL_0 = BER < 0.2% RXQUAL_i = $(0.1*2^i)\%$ < BER < $(0.1*2^{i+1})\%$ (i = 1, . . . ,6) RXQUAL_7 = 12.8% < BER When CS-4 is used on the downlink, mobile stations are permitted to report RX_QUAL = 7, regardless of the quality of the channel. |
| SIGN_VAR | Estimated variance of the received signal strength calculated over correctly decoded blocks. The measured signal variance is reported as a 6 bit binary value. If $(SIGN\_VAR)_{10}$ denotes the decimal value of the 6 bit number, reported SIGN_VAR levels have the following meaning: $(SIGN\_VAR)_{10} = 0$   0 dB$^2$ to 0.25 dB$^2$ $(SIGN\_VAR)_{10} = i$   [0.25*i]dB$^2$ to [0.25*(i + 1)]dB$^2$ (i = 1, . . . ,62) $(SIGN\_VAR)_{10} = 63$  >15.755 dB$^2$ |
| I_LEVEL_TNi (i = 0, . . . ,7) | Estimated received downlink interference power on timeslot i, measured over search and PTCH frames. The measured interference level is reported as a four bit binary value (0000-I_LEVEL 0, . . . , 1111-I_LEVEL 15). Reported I_LEVELs on each timeslot have the following meaning: I_LEVEL 0   interference level is greater than C I_LEVEL i   C − (i + 1)*2 dB < interference |

TABLE 1-continued

Summary of downlink quality measurements reported by Mobile Stations

| Reported Value | Description |
| --- | --- |
| | level ≤ C − i*2 dB (i = 1, . . . ,14) |
| | I_LEVEL 15 interference level ≤ C − 30 dB |

The measurements reported by mobile stations can be used to assess the quality of the downlink channel, as follows:

C_VALUE: The C_VALUE reported by the mobile station m can be used to assess the mean attenuation of the downlink signal received by the mobile station. BCCH_LEVEL-C_VALUE is the average path-loss (in dBm) of the downlink channel. C_VALUE is used as a criterion in base station selection and handover.

RX_QUAL: When CS-1, CS-2 or CS-3 are used, RX_QUAL is the mobile station's estimate of the mean bit error rate of the downlink channel since the last channel quality report was sent. As discussed in the next section, BER is also fairly insensitive to channel propagation effects, and is a good indicator of received C/I levels when these coding schemes are used. It is important to note that BER values are only calculated over RLC/MAC blocks addressed to the mobile which were successfully decoded. As a result, the RX_QUAL values reported by mobiles under high block error rates may give unreliable indications of channel quality.

When CS4 is used on the downlink, a mobile station is allowed to report RX_QUAL=7, regardless of the bit error rate of the channel. See the ETSI GPRS 05.08 system specification. As a result, RX_QUAL is a meaningless measure of link quality when CS4 is used.

SIGN_VAR: SIGN_VAR measures the variance in received signal strength over the four bursts comprising a radio block. High values of SIGN_VAR are indicative of high mobile station speeds, while low values of SIGN_VAR are indicative of slowly moving mobile stations.

Signal strength degradation caused by terrain effects, known as shadow fading, can cause variations in received signal strength on the order of several dB (or more) over on the order of tens of meters. When a slowly moving mobile station moves into a pocket with poor carrier signal strength, it remains there for fairly long periods of time. As a result, bit errors are highly correlated. Furthermore, the variance in received power over successive bursts in a block is relatively low. At higher mobile station speeds, however, mobile stations pass in and out of pockets of poor and good signal strength fairly quickly. At higher speeds, channel bit errors are not as highly correlated as they are at low speeds, and the variation of the power received over multiple bursts within a block tends to be high.

I_LEVEL_TNi. Mobile stations make interference measurements during two search and two PTCCH frames which occur during each 52-multiframe. These four "measurement opportunities" occur once every 60 ms. See ETSI GSM 03.64 version 6.1.0 Release 1997, "Digital cellular telecommunications system (Phase 2+); General Packet Radio Service (GPRS); Overall description of the GPRS radio interface; Stage 2." A mobile station must perform at least $N_{AVG\_I}$ measurements on a timeslot before it can report valid interference measurements for the timeslot ($N_{AVG\_I}$ is a tunable system parameter ranging from 1 to 180). See ETSI GPRS 05.08 system specification. If a valid interference measurement is not available for a timeslot at the time a mobile station sends a channel quality report, no interference measurements are reported for that timeslot.

Downlink Power Control in Dynamic Allocation Mode

GPRS's Dynamic Allocation medium access mode uses the Uplink State Flag (USF) in the header of each downlink block to dynamically control access to the uplink PDCH. See the ETSI GSM 04.60 specification. When an uplink TBF is established for a mobile station m, the network assigns it a USF flag on each timeslot the mobile station has been allotted. When a mobile station detects its USF flag in a downlink block on one of its assigned timeslots, the mobile station begins transmitting uplink blocks on that timeslot during the following uplink block.

Because of the dual role played by downlink blocks when Dynamic Allocation mode is used, downlink power control must be carefully applied. In particular, the power level used to transmit a downlink RLC/MAC block must be high enough for the intended recipient to correctly decode the block (with an acceptable block error rate). Further, the power levels used to transmit a downlink RLC/MAC block should be high enough for mobile stations with active uplink Temporary Block Flows (TBFs) to successfully decode the USF flag embedded in the block's RLC/MAC header (with an acceptable error rate).

GPRS's radio subsystem link control specification (ETSI GSM 05.08, e.g. Section 10.2.2) provides a somewhat vague requirement in this regard: "The output power must be sufficient for the MS for which the RLC block is intended as well as the MS(s) for which the USF is intended (see GSM 04.60)." USF flag decoding errors can lead to inefficient use of the uplink channel. If any mobile stations with active uplink TBFs mis-decode the USF flag and think the USF flag belongs to them, uplink transmissions of two or more mobile stations may collide, wasting uplink bandwidth and increasing transmission delays. In addition, if the intended mobile does not correctly decode the USF flag, uplink bandwidth is wasted. The power used to transmit downlink blocks should be sufficient so that not much uplink bandwidth is lost. If a mobile misses too many USF flags, the network will tear down the TBF.

Downlink power control in Dynamic Allocation mode is subject to another constraint. Wide swings in the power level used to transmit downlink blocks can wreak havoc on mobile stations using predictive Automatic Gain Control (AGC) in their receiver circuits. See ESI GPRS 05.08. Predictive automatic gain control dynamically attenuates or amplifies received signal levels so that the signal fed to the receiver's analog-to-digital converter lies within the converter's operating range. If a receiver's AGC is unable to keep signal levels within the A-to-D converter's operating range, excessively high bit error rates will result.

All mobile stations with active uplink TBFs must extract the USF flag from every downlink block. Predictive AGCs which work well compensating for received signal strength variations caused by environmental effects, however, may not work well if subjected to additional extreme swings in received power levels which could be introduced by downlink power control. Hence, GPRS networks limit the magnitude the fluctuation in downlink transmit power that can be introduced for purposes of downlink power control.

To address the constraints imposed by mobile stations using predictive AGC, two power control modes, mode "A" and "B", have been defined in ETSI GPRS 05.08. Both power control modes limit the range of power levels a base transceiver station may use to send each downlink RLC/MAC block. Power Control Mode A is defined for use with all of GPRS's allocation modes. Power Control Mode B is defined for systems using GPRS's fixed allocation mode. These modes are described as follows:

Power Control Mode A (All allocation modes): The BTS 110 limits its output power on blocks addressed to a particular mobile station (USF or RLC blocks) to levels between (BCCH level-P0 dB, i.e. a Mode A maximum transmit power value) and (BCCH level–P0 dB–10 dB, i.e. the Mode A maximum value attenuated by 10 dB). For other blocks, the output power may not exceed (BCCH level–P0 dB). The output power must be sufficient for the mobile station for which the RLC/MAC block is intended as well as the mobile stations for which the USF is intended. P0 is a value assigned to each mobile station during downlink TBF establishment. Power Control Mode A is the power control mode that must be used for dynamic and extended dynamic resource allocation modes.

Power Control Mode B (Fixed Allocation mode): The BTS 110 is permitted to use its full BCCH output power range (e.g., 30 dB). However, provisions are added to limit the rate at which BTS transmit power levels change. ETSI GPRS 05.08 provides further details on power control mode B. As will be appreciated, the BCCH level (BCCH_LEVEL) is a maximum transmit power level used for certain high-power broadcasts, while a lower maximum transmit power level, namely BCCH_LEVEL-P0 dB, is used for GPRS PDTCH communications.

To help mobile stations determine the transmission power used to transmit a downlink RLC/MAC block, the header of each downlink RLC/MAC block contains "PR field" (see ETSI GSM 04.60). This two-bit "Power Reduction" field encodes the power level relative to BCCH_LEVEL-P0 that was used to transmit the block. Since it is possible for the network to assign different values of P0 to different mobiles, this field alone cannot be used to determine the actual power level used to transmit a downlink block, except for the intended recipient of the downlink block. To overcome the ambiguity in use of the PR field, the GPRS specification (ETSI GPRS 05.08) defines two "power reduction" modes: PR_MODE_A and PR_MODE_B. In PR_MODE_A, the value of the PR field is calculated relative to the P0 value assigned to the intended recipient of the downlink RLC/MAC block. The implicit assumption in PR_MODE_A is that different values of P0 are used for each mobile. In PR_MODE_B, the network must assign the same value of P0 to every mobile in the cell. Hence, when PR_MODE_B is used, each mobile can determine the transmission power level used to send each downlink block from the PR field alone, even when the block is not intended for that mobile. The GPRS network informs the mobile station which PR_MODE is in effect in the Packet Downlink Assignment message (see section 11.2.7 of ETSI GSM 04.60).

When PR_MODE_B is used, P0 should be selected such that when downlink blocks are transmitted at power level (BCCH level–P0), received power levels are sufficient for adequate USF and RLC/MAC performance over a large portion (i.e. 90%) of the cell. Assigning all mobiles the same value of P0 is attractive by virtue of its simplicity.

Downlink power control is subject to one final constraint. For synchronization purposes, the network must ensure that each MS with an active uplink or downlink TBF receives at least one block every 360 ms interval (78 TDMA frames) transmitted with an output power which is consistent with the downlink power control mode used. This block does not have to be addressed to any particular mobile station.

Assumptions Underlying the Downlink Power Control Method

An algorithm implementing the downlink power control method of the present invention, in an embodiment, is based on the following assumptions:

(1) The algorithm must be computationally efficient. The power control application 112 will need to simultaneously control the power levels of hundreds of mobile stations.

(2) The algorithm will use PR_MODE_B. To minimize the amount of airlink and messaging overhead generated by downlink power control, the algorithm must assign the same value of P0 to all mobile systems using the same radio channel. P0, a tunable parameter, will be selected so that C/I levels are adequate for at least CS-1 and uniformly good USF decoding over a large percentage (i.e., 90%) of the cell.

Empirical results show that P0 can be suitably selected so that a GPRS PDTCH (at worst) causes no more downlink interference than the downlink channel of a voice call to a mobile station on the fringes of a cell. PDTCH (packet data traffic channel) transmissions are those in which multiple timeslots and channels are employed, as opposed to a maximum high-power broadcast transmission at the BCCH (Broadcast Common Control Channel) level. This highest PDTCH transmit power level is the BCCH level minus some factor P0. Assigning the same P0 to all mobile stations dramatically simplifies the downlink power control algorithm.

(3) GPRS power control algorithms must adapt quickly. Due to the sporadic nature of data transfer and the small volume of data that will likely be transferred between the network and mobile stations during data transactions, downlink and uplink TBFs will likely last on the order of seconds or less. Power control algorithms must quickly reduce power when possible-otherwise, downlink power control will be ineffective at reducing interference.

(4) ln(BER) is a roughly linear function of C/I (in dB). The slope of the ln(BER) vs. C/I (dB) curves is similar for a wide range of propagation environments. Results plotting ln(BER) vs. C/I (dB) support this assumption. As described below, this property can be exploited to help quickly tune downlink transmit power to a level that achieves desired airlink quality.

Downlink Power Control Method: Overview

Figure 2:
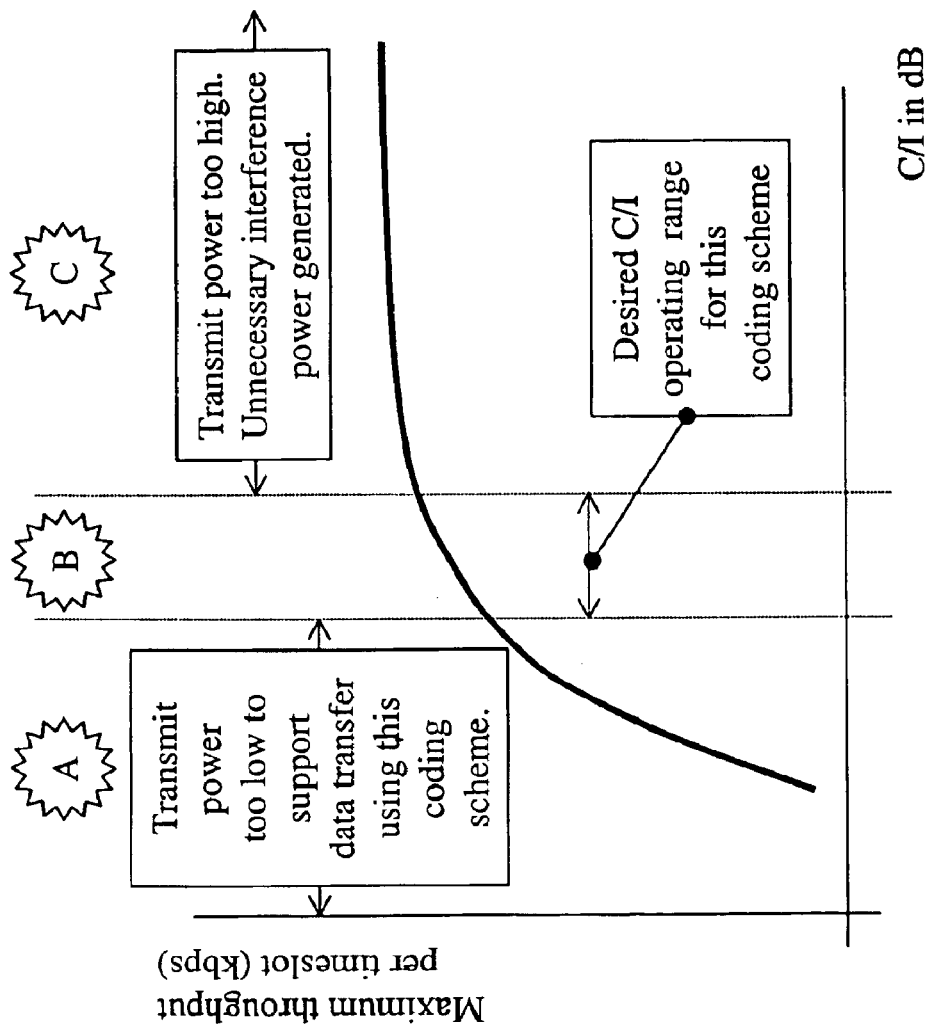
FIG. 2 is a plot of an idealized curve of maximum throughput as a function of C/I for an arbitrary coding scheme, illustrating the quality-based downlink power control algorithm of the present invention.

This section provides a discussion of some of the basic concepts and principles on which the downlink power control algorithm of the present invention is based. A more detailed discussion of an embodiment is provided in a separate section below. The downlink power control algorithm of the present invention is quality-based. Referring now to FIG. 2, there is shown a plot of an idealized curve 200 of maximum throughput as a function of C/I for an arbitrary coding scheme. Curve 200 illustrates the quality-based approach of the present invention. As shown, at low C/I ratios (region "A" in FIG. 2), block error rates are too high to support the use of the coding scheme. If possible, in region "A" a coding scheme employing more redundancy should be used. Region "B", the region surrounding the "knee" of the throughput versus C/I curve 200, denotes the ideal C/I operating range for the coding scheme. In region "B", block error rates are moderate. Region "C" denotes a region of diminishing returns. In region "C", the higher transmit powers used by the BTS to achieve higher C/I levels do not yield substantial increases in LLC throughput for a mobile station. The additional transmit power, however, generates additional interference to co-channel neighbor cells.

The downlink power control algorithm of the present invention preferably is able to adjust transmit powers to hit a desired range of C/I ratios. The appropriate range is a function of which coding scheme is being used. C/I measurements provided by a GPRS mobile station may not be accurate, and take a long time to collect. Hence, it is preferably that the power control algorithm not rely too heavily on the C/I measurements provided by mobile stations.

Figure 3:
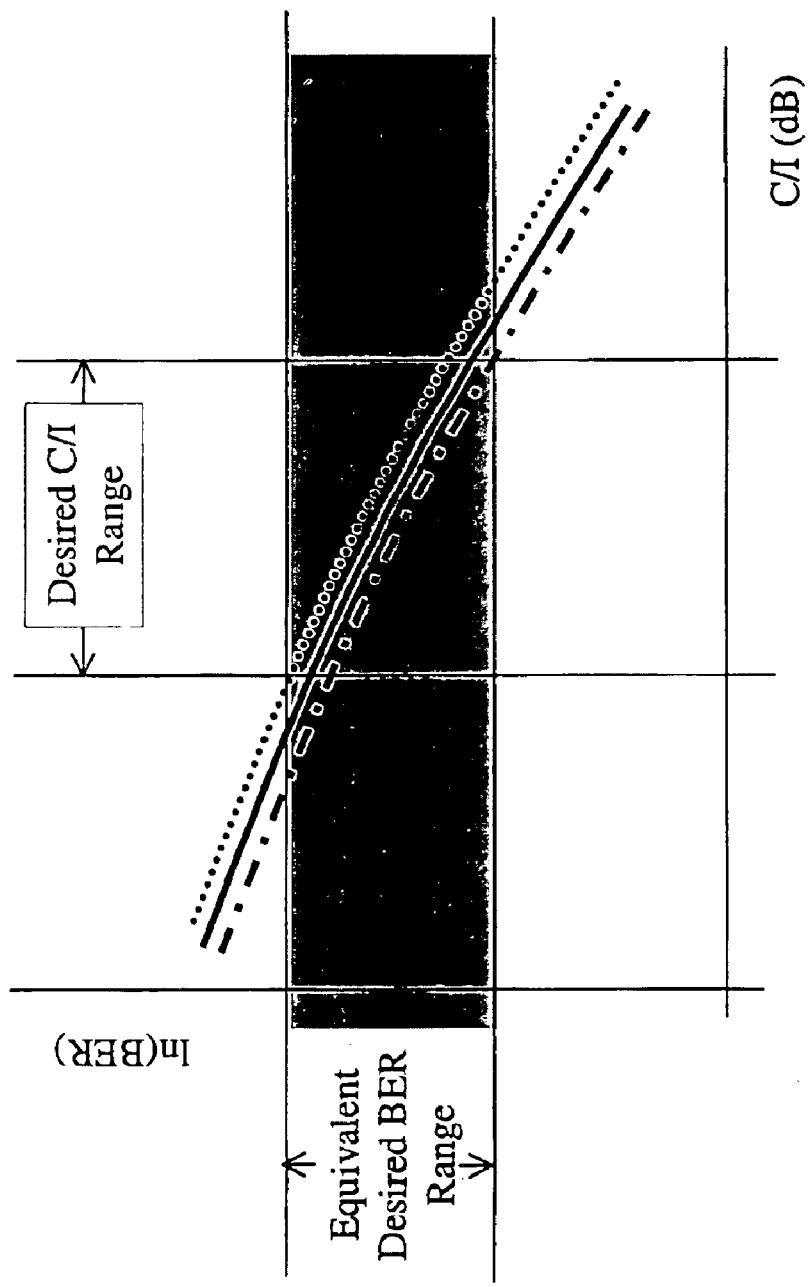
FIG. 3 is a graph illustrating the relationship between desired C/I range and desired BER range.

To work around the limitations of the mobile station's C/I measurements, the present invention exploits the fact that, as a function of C/I, ln(BER) is substantially insensitive to propagation environment. If it is known how ln(BER) is related to C/I, tuning the transmit power to achieve a target C/I range is roughly equivalent to tuning the transmit power to achieve a target BER range. Referring now to FIG. 3, there is shown a graph 300 illustrating the relationship between desired C/I range and desired BER range. BER is a direct measure of link quality reported by the mobile station that does not take long to measure accurately. Accordingly, the quality-based downlink power control algorithm of the present invention is based in part on BER measurements (RXQUAL values) reported by the mobile station in each measurement report at each reporting interval.

In addition to tuning transmission powers to achieve a desired BER range, the downlink power control algorithm determines the C/I (or, equivalently, BER) range that is appropriate for each mobile station. A power control algorithm attempting to achieve C/I levels adequate for CS-3 or CS-4 for mobiles on the fringes of a cell, for example, will likely cause unacceptable levels of interference to co-channel neighbor cells. The target BER range for a given mobile station also depends on the coding scheme being used: High rate codes require lower channel bit error rates, while lower rate codes can operate at higher channel bit error rates.

In an embodiment, a GPRS system is employed in which only CS-1 and CS-2 are supported. This makes determining a target BER range for each mobile station fairly simple. The target C/I range for all mobile stations can be set to roughly 9–12 dB (RXQUAL=5). C/I levels in this range are adequate to support CS-2 in both frequency hopped and non-frequency hopped systems. In addition, in an embodiment the maximum transmit power used by the BTS is limited, to avoid excessive interference to timeslots supporting circuit-switched GSM in co-channel neighbor cells.

In an alternative embodiment in which CS-3 is also supported, the above-described approach may be modified to include logic to determine which mobile stations should receive C/I levels adequate for transmission using CS-3. In such an embodiment, the power control algorithm weighs the benefit of the additional throughput for users with the higher C/I levels needed for CS-3, versus the potential degradation in throughput in co-channel neighbor cells caused by the additional interference. It should be noted that the BER-based approach described above will not work for GPRS systems employing CS-4, however, since the BER reported by mobiles using CS-4 is meaningless.

The following terms and notation are introduced to aid in further describing an embodiment of the GPRS power control algorithm of the present invention. First, we assign consecutive integers n(n=1,2,3, . . . ) to each downlink block sent on each timeslot since the timeslot was activated. At each time n on each GPRS timeslot j, the downlink power control algorithm will select a downlink transmit power equal to [BCCH level–P0–$\Delta$(j,n)] dB, where 0≦$\Delta$(j,n)≦10 dB. Each mobile station is assigned the same value of P0. Confining $\Delta$(j,n) to lie between 0 dB and 10 dB satisfies the transmit power constraints imposed by power control mode A. Since every mobile station is assigned the same value of P0, the algorithm satisfies the constraints imposed by PR_MODE_B.

At each time n, the power control algorithm must select an attenuation level $\Delta$(j,n) such that the intended recipient of the downlink block observes a suitable BER, and that mobile stations with active uplink TBFs can correctly decode the USF flag with acceptable error rate. The attenuation level $\Delta$(j, n) may be referred to herein as the transmit power attenuation level or factor. It is in turn based on the minimum of two other attenuation levels, namely an uplink control flag attenuation factor $\Delta_{USF}$(j,n) and a radio link attenuation level or factor $\Delta_{RLC}^{(m)}$. The latter is in turn based on an optimal radio link attenuation level $\Delta^*$ and an effective attenuation level $\Delta_{eff}^{(m)}$.

Thus, the power control algorithm requires the estimation of two quantities, $\Delta_{RLC}^{(m)}$ and $\Delta_{USF}$(j, n). The radio link attenuation level $\Delta_{RLC}^{(m)}$ denotes the downlink attenuation that mobile station m can tolerate while still achieving acceptable RLC/MAC performance. In other words, downlink RLC/MAC blocks sent to mobile station m using downlink transmit power (BCCH_LEVEL–P0–$\Delta_{RLC}^{(m)}$) dB experience acceptable bit and block error rates. $\Delta_{RLC}^{(m)}$ is adjusted based on the RXQUAL value received in each channel quality report sent by mobile station m.

The uplink control flag attenuation factor $\Delta_{USF}$(j,n) denotes the estimated additional downlink attenuation that can be applied such that adequate USF flag performance is achieved when the $n^{th}$ downlink block is sent on timeslot j. The algorithm adjusts $\Delta_{USF}$(j,n) when uplink TBFs are initiated, when USF flags are missed, or uplink collisions are observed. $\Delta_{USF}$(j,n) is increased if a suitably long period of time passes during which uplink TBFs are active and no USF flag problems are observed.

To ensure that downlink blocks are transmitted at power levels high enough for the intended mobile station m as well as mobile stations x with active uplink TBFs, a downlink block transmitted on timeslot j to mobile m at time n is transmitted with power [BCCH level–P0–min{$\Delta_{RLC}^{(m)}$, $\Delta_{USF}$(j,n)}].

Figure 4:
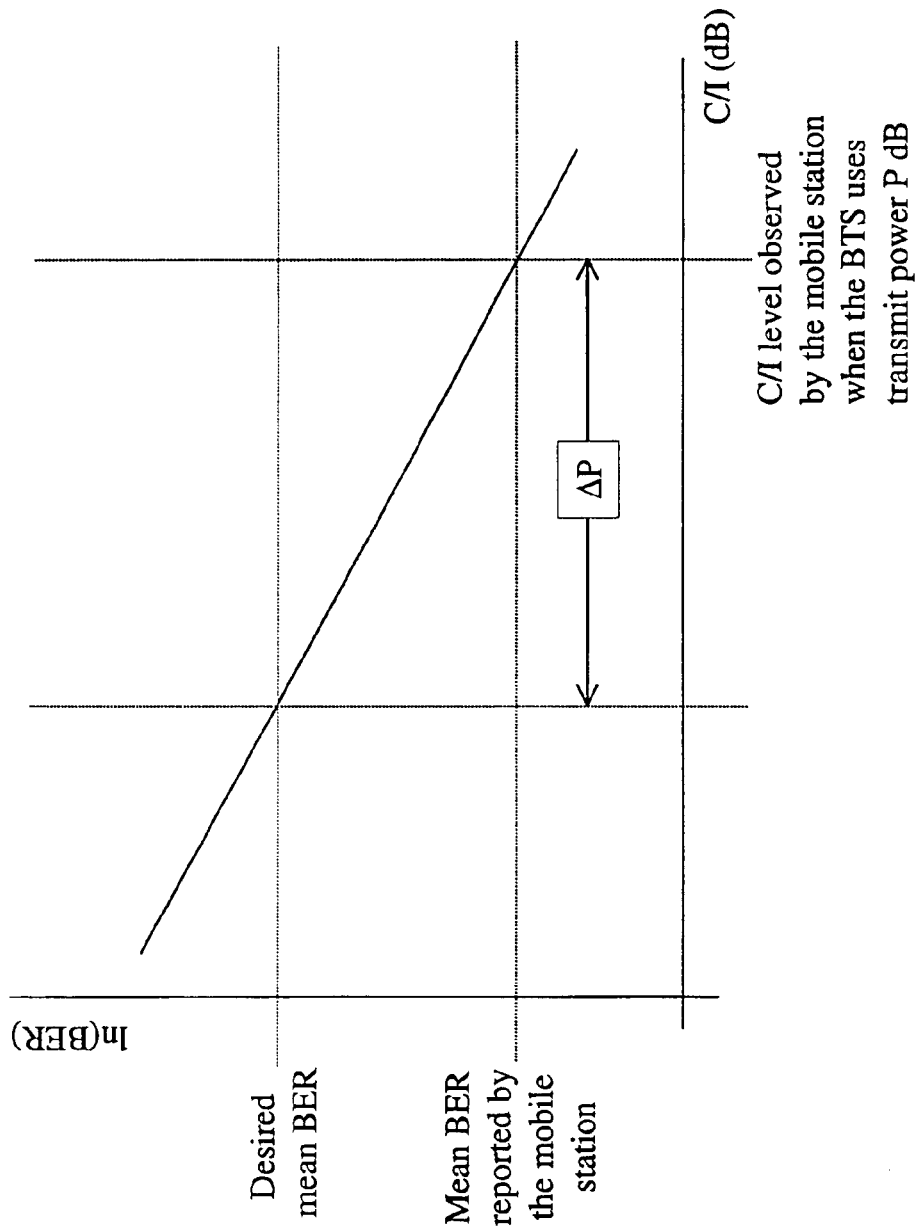
FIG. 4 is a graph illustrating how to determine the transmit power needed to achieve a target BER from the mean BER reported by a mobile when the base station uses a constant transmit power P dB to send every block to the mobile during the measurement interval.

BER measurements reported by the mobile station m give a strong indication of how much transmission power should be increased or decreased to achieve desired airlink performance. Assume that interference power and downlink attenuation caused by environmental effects (path loss and shadow fading) are constant over the measurement interval. Referring now to FIG. 4, there is shown a graph 400 illustrating how to determine the transmit power needed to achieve a target BER from the mean BER reported by a mobile when the base station uses a constant transmit power P dB to send every block to the mobile during the measurement interval. Knowing the relationship between BER and C/I, we determine that reducing the transmit power from P dB to (P–$\Delta$P) dB should achieve the desired mean BER, for example.

Due to the dependency of transmit power on the quantity $\Delta_{USF}$(j,n) in the power control technique of the present invention, however, the power used to transmit downlink blocks to each mobile station may vary from block-to-block over the reporting interval. Blocks transmitted with high power will experience bit error rates which are lower than those experienced by blocks sent with lower transmit powers. This makes it more difficult to interpret the meaning of the average BER reported by the mobile station, which is an average over the previous group of blocks, each of which may have been transmitted at different transmit power levels.

In an embodiment, the technique illustrated in FIG. 4 is adapted to account for variation in transmit power over the measurement interval. Let BER(x) denote the mean bit error rate of the airlink when the mean C/I observed by the mobile station m is xdB. Under our linearity assumptions on ln(BER(x)) outlined above, the mean bit error rate when the mean C/I is xdB is well-approximated by the following expression of Eq. (1):

$$BER(x) = k^{(m)} \cdot e^{-\alpha x} \tag{1}$$

where $\alpha$ is the slope of the line which approximates the ln(BER) versus C/I plots and $k^{(m)}$ is a factor that reflects the RF environment observed by mobile station m. $\ln(k^{(m)})$ is the intercept of the ln(BER) versus C/I plot for mobile station m.

Let $p^{(m)}(\Delta_i)$ denote the fraction of blocks sent over a measurement (reporting) interval at attenuation level $\Delta_i$ to mobile station m over a measurement interval. Let $\overline{BER}^{(m)}$ denote the mean bit error rate measured by mobile station m over the measurement interval. Let BER* denote the target bit error rate we are attempting to achieve for mobile station m. Let (C/I)* denote the C/I level at which the mean bit error rate experienced by mobile station m is BER*.

Figure 5:
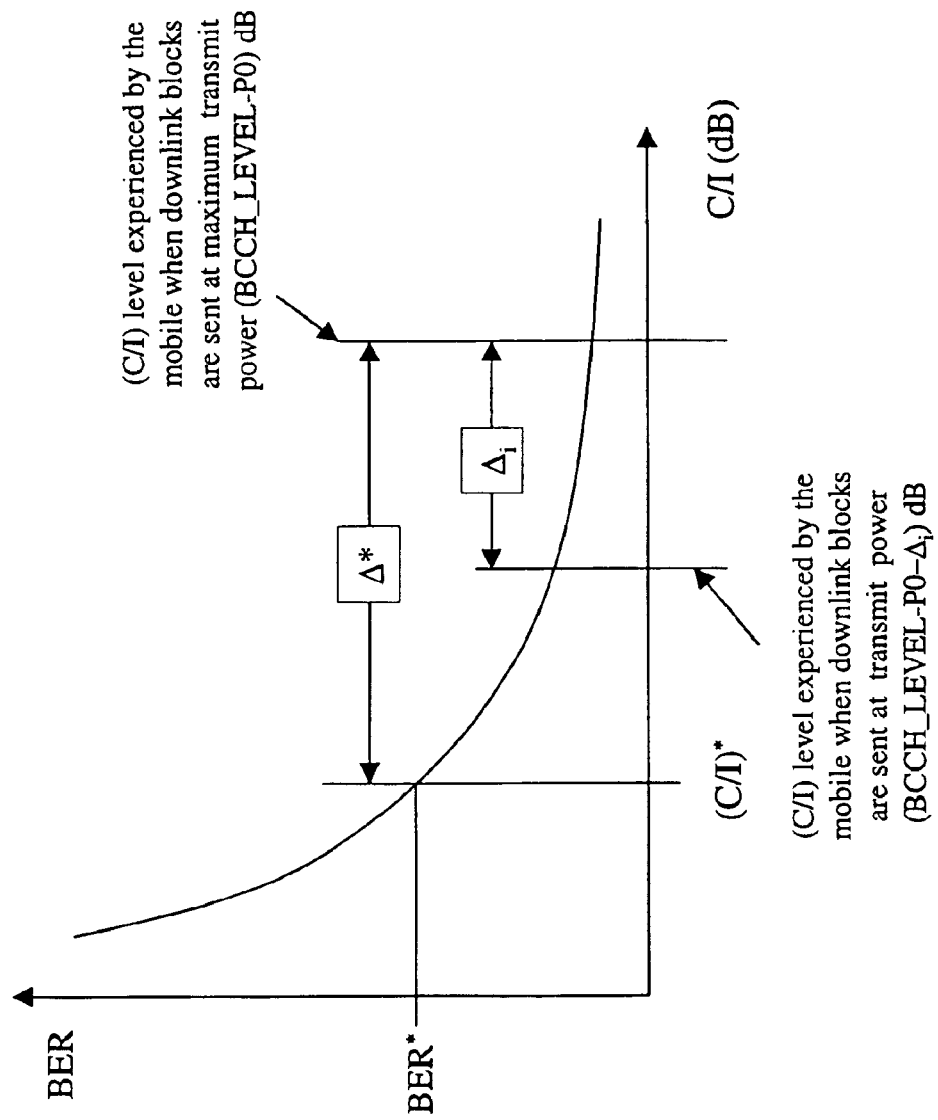
FIG. 5 is a graph showing the relationship between BER and downlink power control attenuation used for a block.

Again, assume that interference power and downlink attenuation caused by environmental effects (path loss and shadow fading) are constant over the measurement interval. Under this assumption, changes in C/I observed by the mobile station over a measurement interval are the direct result of the attenuation level applied by the downlink power control algorithm. This is illustrated in FIG. 5, which contains a graph 500 showing the relationship between BER and downlink power control attenuation used for a block. Let $\Delta^*$ denote an unknown attenuation level in dB that the power control algorithm should apply to achieve the carrier-to-interference ratio (C/I)* for mobile station m. Assume that all downlink blocks sent by the network are correctly received by the mobile station.

Under these assumptions, the mean bit error rate observed by a given mobile station i during the measurement interval is:

$$\overline{BER}^{(m)} = \sum_i p^{(m)}(\Delta_i) \cdot k^{(m)} \cdot e^{-\alpha((C/I)^* + \Delta^* - \Delta_i)} \tag{2}$$

Rearranging terms, Eq. (2) becomes:

$$\overline{BER}^{(m)} = \sum_i p^{(m)}(\Delta_i) \cdot k^{(m)} \cdot e^{-\alpha(C/I)^*} \cdot e^{-\alpha(\Delta^* - \Delta_i)} = \tag{3}$$

$$BER^* \cdot e^{-\alpha \Delta^*} \sum_i p^{(m)}(\Delta_i) \cdot e^{\alpha \Delta_i}$$

Solving for $\Delta^*$:

$$\Delta^* = \frac{\ln(BER^*) - \ln(\overline{BER}^{(m)}) + \ln\left(\sum_i p^{(m)}(\Delta_i) e^{\alpha \Delta_i}\right)}{\alpha} \tag{4}$$

Note that $\Delta^*$, the attenuation needed to hit the target bit error rate BER*, is now expressed using parameters known by the power control application 112 for every mobile station m.

Eq. (4) forms the basis of an algorithm to update $\Delta_{RLC}^{(m)}$. By keeping track of the attenuation levels used to transmit blocks to a mobile over a measurement period, the GPRS network can calculate $\Delta^*$ each time it receives a measurement report. As will be understood, $\Delta^*$ represents how much the transmit power should be attenuated in order to achieve the desired BER for the downlink. This is thus an ideal or optimal attenuation which theoretically reduces the transmit power as much as possible while still achieving acceptable BER. On account of measurement errors, however, variation in channel quality over the measurement interval and our imperfect knowledge of the relationship between BER and C/I, $\Delta^*$ must be taken with a grain of salt.

If a constant attenuation level $\Delta_{RLC}^{(m)}$ had been used to transmit each downlink block to mobile m during a measurement interval, the following update step may be used:

$$\Delta_{RLC}^{(m)} \leftarrow \Delta_{RLC}^{(m)} + p \cdot (\Delta^* - \Delta_{RLC}^{(m)}) \tag{5}$$

where p ($0 \leq p \leq 1$) reflects our confidence in our estimate of $\Delta^*$. If, instead, more than one transmit power level is used to send downlink blocks to mobile m during a measurement interval, this approach must be slightly modified. As described as follows, an "effective attenuation level", $\Delta_{eff}^{(m)}$, can be calculated. This level is chosen such that if the attenuation level $\Delta_{eff}^{(m)}$ were used for each downlink block, the downlink channel would have had the same mean bit error rate characteristics as a channel in which different attenuation levels are used to send downlink blocks.

Thus, we have:

$$\overline{BER}^{(m)} = \sum_i p^{(m)}(\Delta_i) k^{(m)} e^{-\alpha((C/I)^* + \Delta^* - \Delta_i)} = k^{(m)} e^{-\alpha((C/I)^* + \Delta^* - \Delta_{eff})} \tag{6}$$

and, hence:

$$\Delta_{eff}^{(m)} = \frac{\ln\left(\sum_i p^{(m)}(\Delta_i) e^{\alpha \Delta_i}\right)}{\alpha} \tag{7}$$

The update step then becomes:

$$\Delta_{RLC}^{(m)} \leftarrow \Delta_{eff}^{(m)} + p \cdot (\Delta^* - \Delta_{eff}^{(m)}) \tag{8}$$

For all mobile stations, $\Delta_{RLC}^{(m)}$ is initially set to 0. Over the lifetime of mobile station i's downlink TBF, adjustments are made to $\Delta_{RLC}^{(m)}$ in response to BER measurements reported in each of mobile station m's channel quality reports using an update step similar to the one shown in Eq. (8). The effect of these adjustments on downlink transmit power is illustrated in FIG. 6, which shows BTS transmit power over time for the lifetime of a downlink TBF.

Temporal Correlation for Bursty Downlink TBFs

Figure 6:
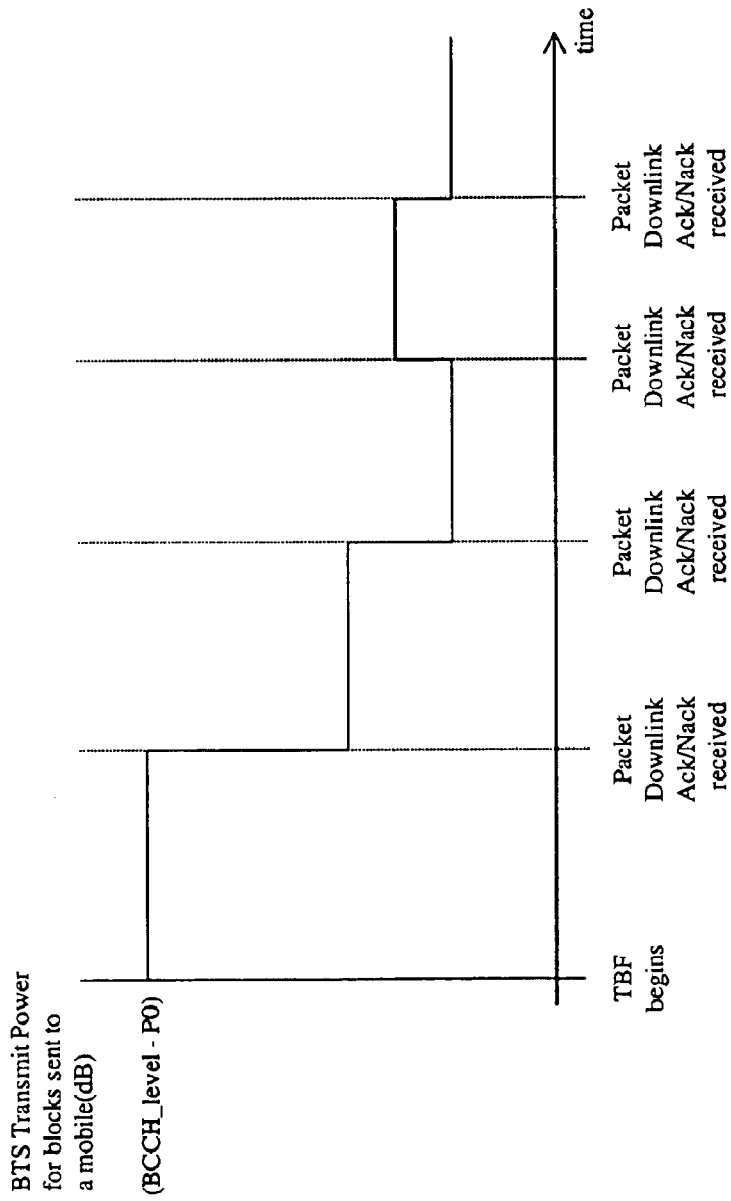
FIG. 6 is a graph showing BTS transmit power adjustments over time for the lifetime of a downlink TBF to illustrate the effect of said adjustments on downlink transmit power.

As illustrated in FIG. 6, the power adjustments in response to each measurement report can result in substantial reductions in transmit power levels for long-lived TBFs. For TBFs consisting of only a few downlink blocks, however, this mechanism alone will not result in any reduction in downlink transmit power: by the time the fist measurement report is received, there may be no more downlink blocks to send to the mobile. Such "short-lived" TBFs will likely be common in GPRS networks. Hence, in an embodiment, the downlink power control method of the present invention is further modified to take this into account, as described below.

Data transfer for GPRS applications may tend to be "bursty," i.e. several packets sent over a relatively short period of time. For such applications, the period of time between packets may be long enough for a downlink TBF to be torn down. TBFs for mobiles running such applications will be short-lived. However, once a TBF is torn down, another will likely be set up again soon after.

The downlink power control of the present invention may be employed to reduce transmit power reduction even for users running such bursty data applications. Path-loss, shadowing, and interference conditions in the cellular environment tend to be highly correlated over short periods of time (on the order of seconds). As a result of this high correlation, a downlink TBF with mobile station m beginning a short period of time after its previous downlink TBF on the same timeslot can be expected to experience similar airlink quality. Thus, in an embodiment, a feature of the downlink power control algorithm of the present invention takes advantage of this correlation, as follows.

Figure 7:
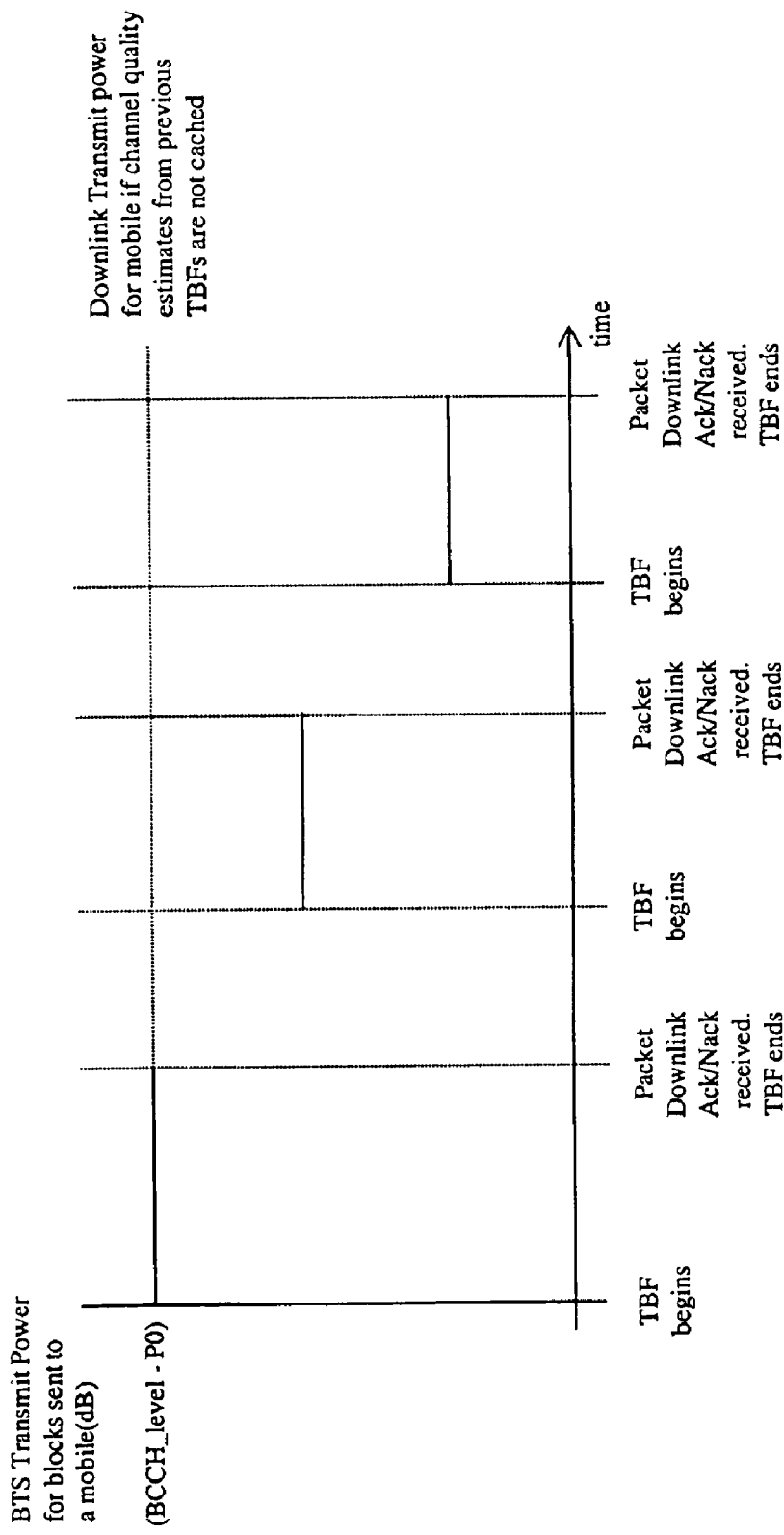
FIG. 7 is a graph illustrating additional reductions in transmit power level using the temporal correlation caching technique of the present invention.

At the end of each downlink TBF, the algorithm caches both $\Delta_{RLC}^{(m)}$ and the time $\Delta_{RLC}^{(m)}$ was last updated. This may be stored in memory 113 by CPU 111, running application 112, for example. When a subsequent downlink TBF is established for mobile station m, $\Delta_{RLC}^{(m)}$ and the time of the last update are retrieved from the algorithm's cache in memory 113. The algorithm decreases $\Delta_{RLC}^{(m)}$ to account for the time that had elapsed since mobile station m's previous downlink TBF. If a suitably long period of time has passed since the previous TBF, or if the previous TBF ended abnormally, the algorithm sets $\Delta_{RLC}^{(m)}=0$ for subsequent TBFs. Referring now to FIG. 7, there is shown a graph 700 illustrating additional reductions in transmit power level using the temporal correlation caching technique described above, i.e. when RF channel quality is cached from one TBF to the next.

In an embodiment, the downlink power control algorithm dynamically adjusts $\Delta_{USF}(j,n)$ as new uplink TBFs start, in response to missed USF flags or collisions on channel j, and if suitable long periods of time pass during which no USF errors are observed. Since uplink TBFs are also likely to be short-lived and bursty, each time an uplink TBF with mobile m ends, the algorithm caches the current value of $\Delta_{USF}(j,n)$ and the time the uplink TBF ends. An aging mechanism similar to the one used for is $\Delta_{RLC}^{(m)}$ applied to the value of $\Delta_{USF}(j,n)$ cached at the end of mobile m's last uplink TBF.

Downlink Power Control Method: Detailed Discussion

A detailed discussion of an embodiment of the downlink power control method and algorithm of the present invention is provided in this section. Variables to help specify the downlink power control algorithm are summarized in Table 2. Table 3 summarizes the algorithm's tunable parameters. The notation $[x]^+$ is used to denote a mapping of x onto an element in the set $\{0, 2, 4, 6, 8, 10\}$. Other mappings may also be used.

TABLE 2

Variables used by the downlink power control algorithm

| Variable | Units | Definition |
|---|---|---|
| $\Delta_{RLC}^{(m)}$ | dB | Estimated additional downlink attenuation under which mobile station m will experience acceptable RLC/MAC performance. With high probability, mobile station m will correctly decode an RLC/MAC block encoded with CS-2 and transmitted at power level (BCCH level − P0 − $\Delta_{RLC}^{(m)}$) dB. (0 dB ≤ $\Delta_{RLC}^{(m)}$ ≤ 10 dB |
| P0$^{(m)}$ | dB | Assigned power reduction for user m relative to BCCH transmit power. Consistent with the requirements imposed by PR_MODE_B, the algorithm will assign the same value of P0$^{(m)}$ to all users in the cell. (P0$^{(m)}$ ≥ 0 dB) |
| $\Delta_{AVG}^{(m)}$ | dB | Average additional downlink attenuation used to send downlink RLC/MAC blocks to mobile station m. (0 dB ≤ $\Delta_{AVG}^{(m)}$ ≤ 10 dB) |
| $\Delta_{USF}(j,n)$ | dB | Average additional downlink attenuation on timeslot j at time n which results in acceptable USF flag performance for all mobiles in the cell with active uplink TBFs. (0 dB ≤ $\Delta_{USF}(j,n)$ ≤ 10 dB) |
| $\Delta(j,n_{curr})$ | dB | Additional downlink attenuation used to send a downlink block on timeslot j at the current time. (0 dB ≤ $\Delta(j,n_{curr})$ ≤ 10 dB.) |
| $Q_{RLC}^{(m)}$ | unitless | Quantity tracked by network for power control to compensate for different attenuation levels used to send downlink blocks to mobile station m during a reporting period. |
| $\Delta_{RLC}^{*(m)}$ | dB | Additional downlink attenuation needed to meet mobile station m's target BER as estimated from the RX_QUAL level reported by mobile station m. (dB) |
| BER*$^{(m)}$ | Bit error rate (%) | Target bit error rate (%) for mobile station m. Will be the same for all mobiles with only CS-1 and CS-2 deployed. IF CS-3 is also deployed, this value will depend on how far mobile is away from base station, current interference levels, and so on. With only CS-1 and CS-2, BER*$^{(m)}$ is the same for all mobile stations in the cell. (BER*$^{(m)}$ = 3%) |
| $\overline{BER}^{(m)}$ | Bit error rate (%) | Assumed mobile-reported bit error rate (%) for mobile m based on the RXQUAL level reported in mobile m's measurement report. |
| RXQUAL$_{meas}^{(m)}$ | unitless | The RXQUAL value reported by mobile m in a channel quatity report. (0 ≤ RXQUAL$_{meas}^{(m)}$ ≤ 7) |
| BLER$_{meas}^{(m)}$ | Block error rate (%) | Block error rate (%) as estimated from the number of blocks incorrectly received by mobile station m over the measurement interval. |
| $n_{cache}^{(m)}$ | seconds | The index of the block when mobile m's last uplink or downlink TBF ended. |
| $n_{curr}$ | seconds | Index of block currently being transmitted. |
| NBLK$^{(m)}$ | unitless | Cumulative number of downlink RLC/MAC blocks that have been sent to mobile station m since the last channel quality report was received. |

TABLE 3

Tunable parameters used by the downlink power control algorithm

| Algorithm tunable parameter | Units | Definition |
|---|---|---|
| P0 | dB | Attenuation on PDCH relative to BCCH used for all mobile stations in the assignment message. P0 ≥ 0. |
| BCCH_level | dB | BCCH power level. |
| RX$_{emergency}$ | unitless | If RXQUAL$_{meas}^{(1)}$ ≥ RX$_{emergency}$, the algorithm will make an "emergency" change to the additional downlink attenuation level used for mobile i. (0 ≤ RX$_{desired}$ < RX$_{emergency}$ ≤ 7.) |
| BER* | unitless | Desired RXQUAL level for acceptable RLC/MAC performance. (0 ≤ RX$_{desired}$ ≤ 7.) |
| $\Delta_{emergency}$ | dB | Decrease in additional downlink attenuation in response to a very bad RXQUAL value. (Must be a multiple of 2 with 0 < $\Delta_{emergency}$ ≤ 10.) |
| BLER$_{emergency}$ | % | Block error rate during a measurement interval beyond which we can no longer trust the BER value reported by a mobile station. |
| $\Delta_{USF}^{START}$ | dB | Attenuation level to use for a mobile with |

TABLE 3-continued

Tunable parameters used by the downlink power control algorithm

| Algorithm tunable parameter | Units | Definition |
|---|---|---|
| | | an uplink TBF when no uplink power Control state information is available in the algorithm's cache. ($0 \leq \Delta_{USF}^{START} \leq 10$ dB.) |
| $\alpha$ | Ln(BER)/ (C/I in dB) | Slope of the ln(BER) versus C/I (dB) plot. ($\alpha < 0$) |
| p | unitless | Gain used to dampen increases in additional downlink attenuation made in response to channel quality reports. ($0 < p \leq 1$) |
| $r_{RLC}$ | dB/block | Rate at which cached values of $\Delta_{RLC}^{(m)}$ are aged over time. ($r_{RLC} > 0$.) |
| $r_{USF}$ | dB/block | Rate at which cached values of rhd USF are aged over time. ($r_{USF} > 0$) |
| $N_{RT}$ | blocks | Number of blocks between the time a USF flag is sent, and the BTS receives feedback of whether there was a collision. |
| USF_DECR | dB | Decrease in $\Delta_{USF}$ (j,n) made in response to a collision/missed USF flag. (Must be a multiple of 2 with $0 < $ USF_DECR $\leq 10$.) |
| USF_INCR | dB | Increase in $\Delta_{USF}$ (j,n) when no collisions/ missed USF flags are observed after a suitable period of observation. (Must be a multiple of 2 with $0 <$ USP_INCR $\leq 10$.) |
| W | blocks | Window over which we observe whether USF errors have occurred to determine whether it is OK to increase USF flag attenuation level $\Delta_{USF}$ (j, n). ($W > 0$.) |
| K | blocks | Minimum number of times downlink blocks have been sent using the USF flag attenuation level during the USF flag observation window W before we can increase the USF flag attenuation level. ($0 < K \leq W$.) |

Downlink Power Control Initialization at the Start of a Downlink TBF

Figure 8:
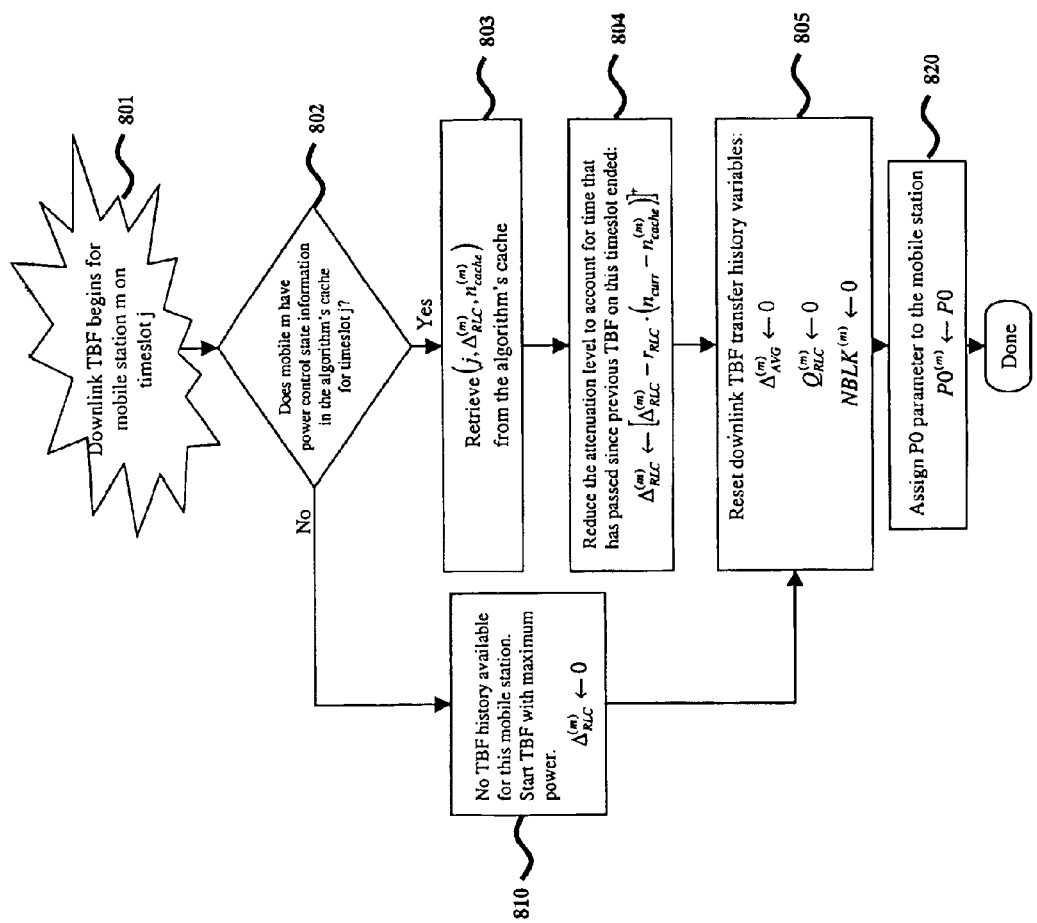
FIG. 8 is a flow chart illustrating the procedure for selecting $\Delta_{RLC}^{(m)}$ and initializing downlink power control variables at the start of mobile m's downlink TBF, in accordance with the power control technique of the present invention.

Referring now to FIG. 8, there is shown a flow chart 800 illustrating the procedure for selecting an initial value for $\Delta_{RLC}^{(m)}$ and initializing downlink power control variables at the start of mobile m's downlink TBF, in accordance with the power control technique of the present invention. First, the downlink TBF begins for a mobile station m at timeslot j (step 801). If mobile m does not have power control state information for timeslot j in the cache, then there is not TBF history available for the mobile station, and the TBF is started with maximum power (steps 802, 810). Otherwise, the power control state information is retrieved from the cache (step 803), and the attenuation level is reduced, based on this information and based on the time elapsed (step 804). Then, whether or not the history information was available, the downlink TBF transfer history variables are reset, and P0 parameters are assigned to the mobile station m (steps 805, 820). Thus, in sum, at the start of mobile m's downlink TBF, the actual power attenuation $\Delta_{RLC}^{(m)}$ is set to zero, unless there is previous power control state information for timeslot j cached, in which case the actual power attenuation is set to the previous power attenuation, reduced to account for elapsed time.

Receipt of a Packet Downlink Ack/Nack Message

Figure 9:
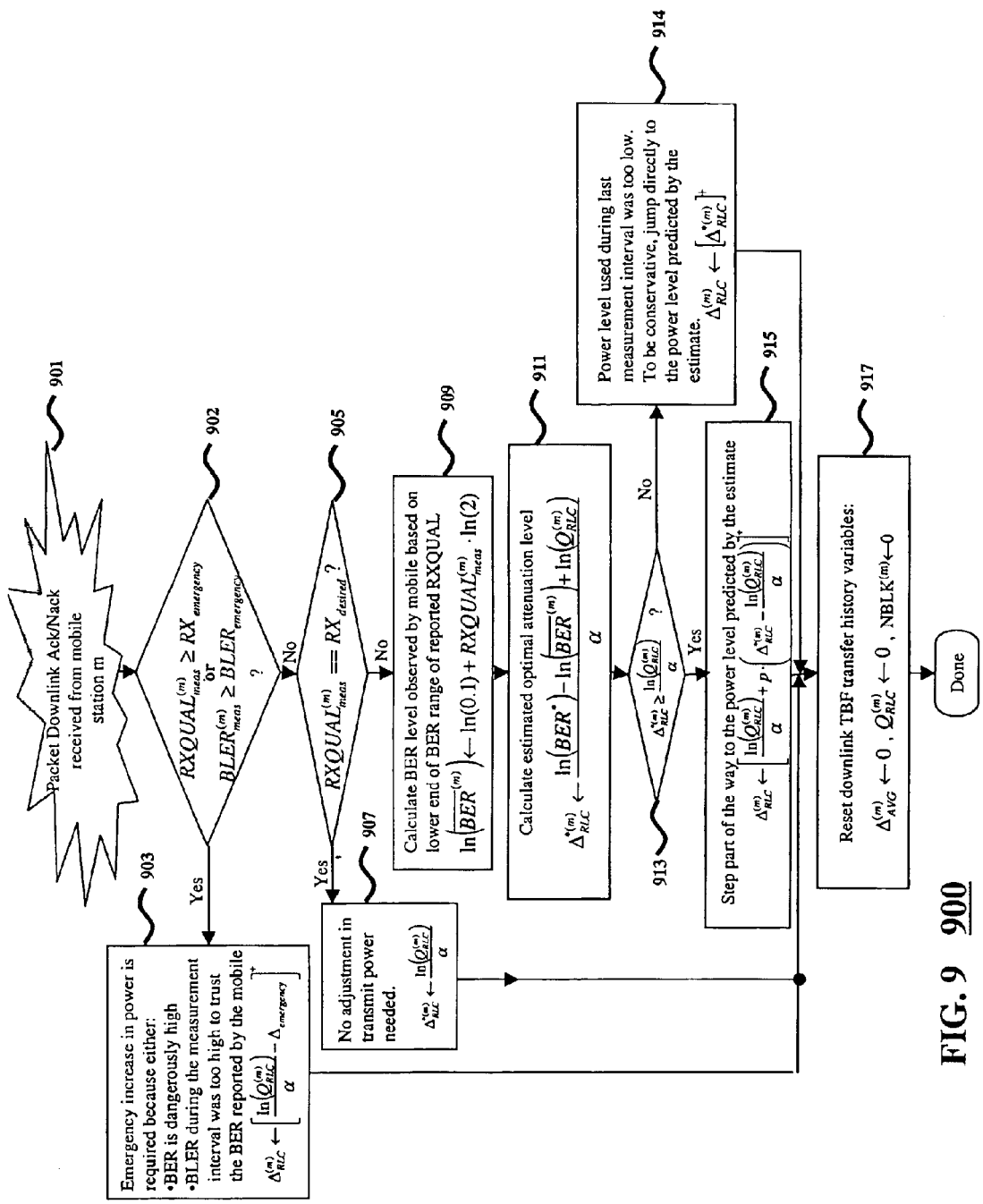
FIG. 9 is a flow chart illustrating the procedure for updating $\Delta_{RLC}^{(m)}$ on receipt of a measurement report, in accordance with the power control technique of the present invention.

Referring now to FIG. 9, there is shown a flow chart 900 illustrating the procedure for updating the attenuation factor $\Delta_{RLC}^{(m)}$ on receipt of a measurement report (RXQUAL levels reported in Packet Downlink Ack/Nack measurements), in accordance with the power control technique of the present invention. After the measurement report is received from mobile station m (step 901), mobile estimates of downlink BER are calculated using successfully decoded blocks (step 902). Under high BER, the mobile reported BER could substantially underestimate the actual BER. If the block error rate (BLER) is too high ($\geq BLER_{emergency}$) over a measurement interval, or if the reported BER is dangerously high ($\geq RX_{emergency}$) (step 902), then $\Delta_{RLC}^{(m)}$ is sharply reduced by subtracting therefrom an amount $\Delta_{emergency}$ (step 903).

Otherwise, if BER and BLER are not too high, then, if the reported BER is equal to the desired BER $RX_{desired}$ (step 905), then no adjustment in transmit power is needed, and $\Delta_{RLC}^{(m)}$ is set to the effective attenuation level $\Delta_{eff}^{(m)}$ (step 907).

Otherwise, if the BER is lower than necessary, the attenuation can be increased, as done in step 909. In order to be conservative, it is assumed that the BER of the downlink channel is equal to the highest BER in the range of BERs spanned by $RXQUAL_{means}^{(m)}$. Thus, in step 909, the BER level observed by the mobile m is calculated based on the lower end of the BER range of reported RXQUAL. Next, an estimate is calculated for the optimal additional downlink attenuation needed to achieve the desired bit error rate BER*, employing a version of Eq. (4), above (step 911). This optimal amount is then compared to the effective attenuation level used over the measurement interval (step 913). If it is not greater than the effective attenuation level, then the power level used during the last measurement interval was too low, and, to be conservative, we jump directly to the power level predicted by the estimate, i.e. we use the ideal or optimal attenuation as the actual attenuation (step 914). Otherwise, Eq. (5) is used to step only part of the way to estimated optimal power level (step 915). In addition, after the actual attenuation factor is set, then the downlink TBF transfer history variables are reset (step 917).

Caching Downlink Power Control State Information at the End of a Downlink TBF

Figure 10:
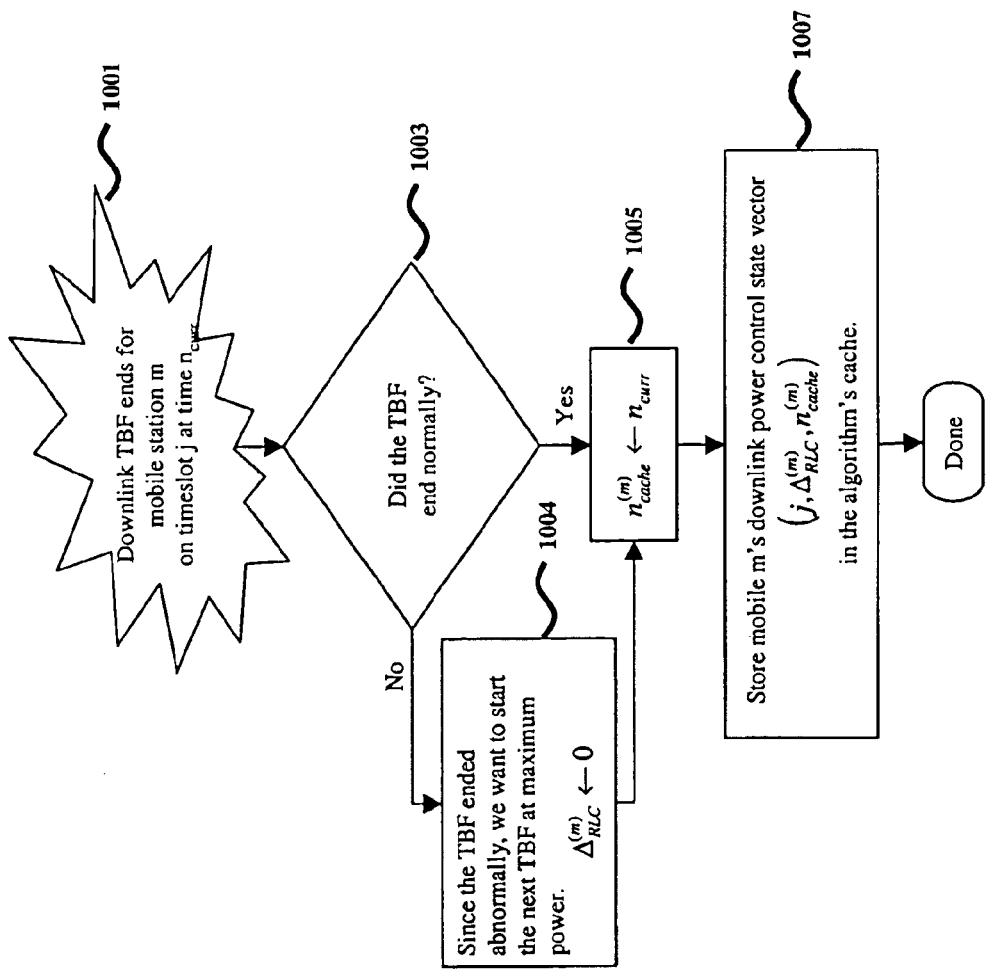
FIG. 10 is a flow chart illustrating the caching of downlink power control state information at the end of a mobile station's downlink TBF.

Referring now to FIG. 10, there is shown a flow chart 1000 illustrating the caching of downlink power control state information at the end of a mobile station's downlink TBF. After the final Packet Downlink Ack/Nack message for a downlink TBF is received from mobile m (i.e., when the downlink TBF ends, on timeslot j, at time $n_{curr}$, step 1001), $\Delta_{RLC}^{(m)}$ is updated using the procedure described in the preceding section with reference to FIG. 9. In an embodiment, $\Delta_{RLC}^{(m)}$, the mobile m's last Packet Downlink Ack/Nack message, and the timeslots the TBF used, are stored in the algorithm's cache, e.g. in memory 113, if the TBF ended normally (steps 1003, 1005, 1007). These values may collectively be referred to as the downlink power control state vector. If the TBF ended abnormally, $\Delta_{RLC}^{(m)}$ is set 0 before the mobile station m's downlink power control state vector is cached (steps 1003, 1004, 1005, 1007).

Selecting the Power Level Used to Transmit Downlink Blocks

Figure 11:
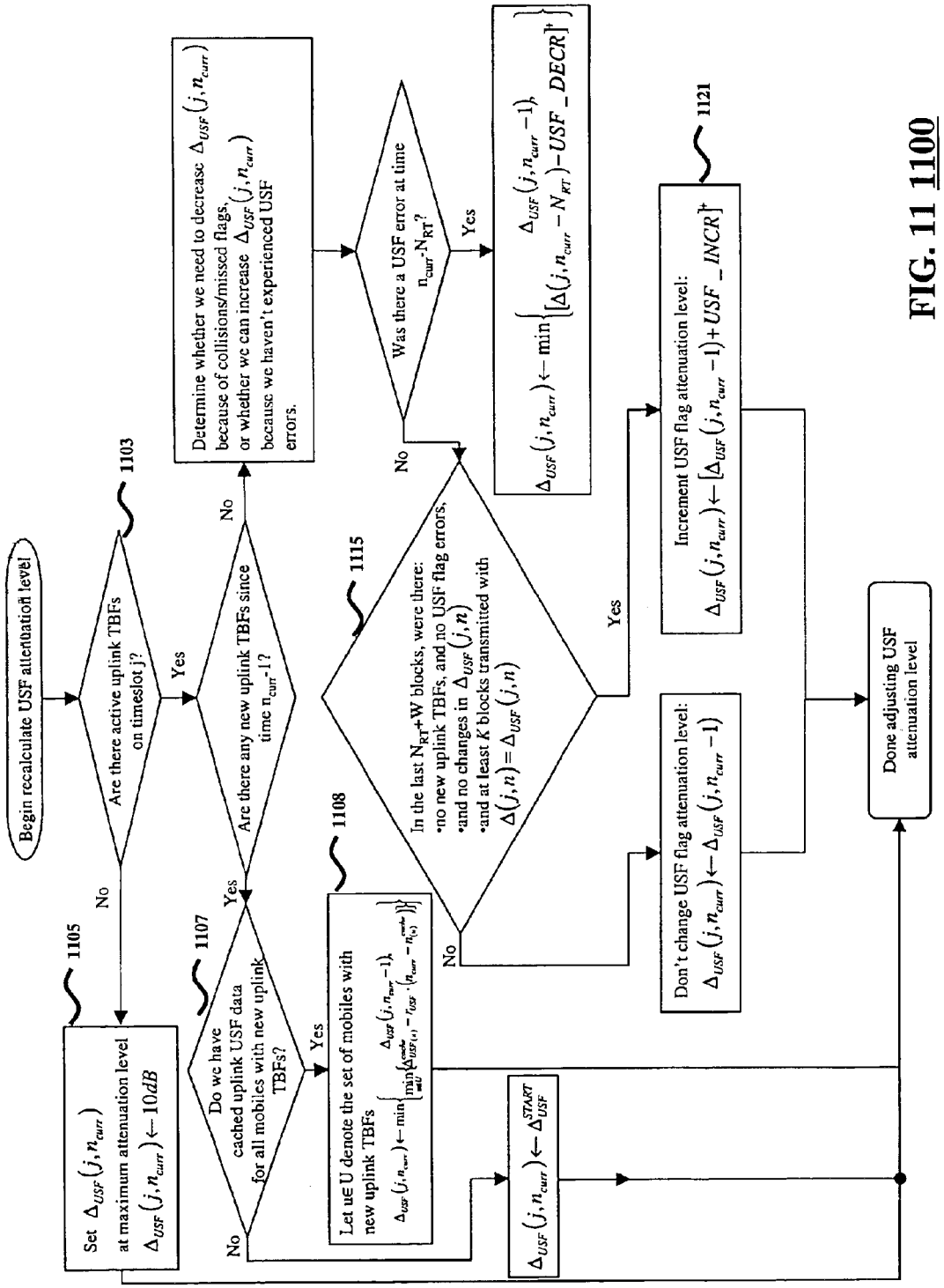
FIG. 11 is a flow chart illustrating a method for updating the USF flag attenuation level before selecting a power level to transmit a downlink block at time n on timeslot j.
Figure 12:
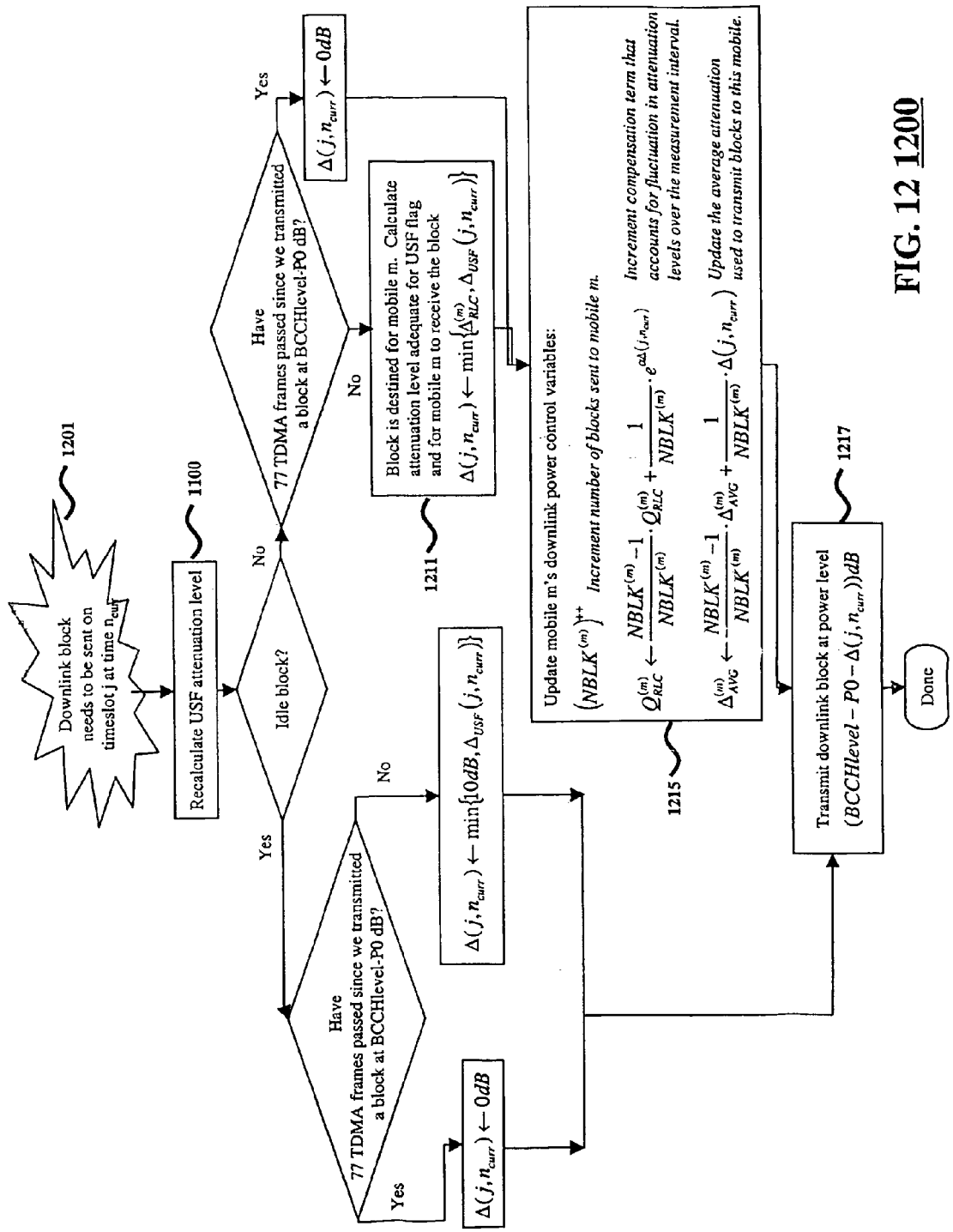
FIG. 12 is a flow chart illustrating the method for determining the actual transmission power used to transmit a downlink block.

Before selecting a power level to transmit a downlink block at time n on timeslot j, the downlink power control algorithm determines whether any adjustments to $\Delta_{USF}(j,n)$ are needed. Referring now to FIG. 11, there is shown a flow chart 1100 illustrating a method for updating the USF flag attenuation level $\Delta_{USF}(j,n)$. $\Delta_{USF}(j,n)$, an estimate of the maximum attenuation level which gives suitable USF flag performance for mobiles with uplink TBFs, must be adjusted to account for collisions/missed USF flags and new uplink TBFs on timeslot j. (Note that, if there are no active uplink TBF's on timeslot j, then $\Delta_{USF}(j,n)$ is set to the maximum possible attenuation level (e.g., 10 dB) (steps 1103, 1105), for reasons explained below with reference to FIG. 12.) In general, $\Delta_{USF}(j,n)$ can be increased when suitably long periods of time pass during which no USF flag errors were observed, as illustrated in further detail in FIG. 11 (steps 1115, 1121). Thus, for example, $\Delta_{USF}(j,n)$ is incremented if, in a specified previous number of blocks, there have been no new uplink TBFs and no USF flag errors and no changes in the uplink control flag attenuation level (step 1121) and, in an embodiment, if at least K blocks have been transmitted with $\Delta(j,n_{curr})=\Delta_{USF}(j,n)$ Referring now to FIG. 12, there is shown a flow chart 1200 illustrating the procedure for determining the actual transmission power used to transmit a downlink block, which is to be transmitted on timeslot j at time n (step 1201). After $\Delta_{USF}(j,n)$ has been updated using the procedure shown in FIG. 11 (step 1100 of FIG. 12), the algorithm determines the power level needed for both acceptable USF flag performance for mobiles with uplink TBFs, and for the intended recipient of the downlink block to achieve acceptable RLC/MAC performance. In particular, for a block destined for mobile m, the attenuation factor $\Delta(j,n_{curr})$ to be used in step 1217 is set to the minimum of the mobile m attenuation factor $\Delta_{RLC}^{(m)}$ and the USF attenuation factor $\Delta_{USF}(j,n)$ (step 1211). As noted above with reference to steps 1103, 1105 of FIG. 11, the USF attenuation factor $\Delta_{USF}(j,n)$ is set to the maximum attenuation 10 dB if there are no active uplink TBF's on timeslot j. Thus, in this case, $\Delta(j,n_{curr})=\Delta_{RLC}^{(m)}$. That is, where there are no active uplink TBFs on timeslot j, then only the attenuation factor designed to ensure good results for destined mobile m need be considered. Otherwise, the smaller of the mobile m attenuation factor $\Delta_{RLC}^{(m)}$ and the USF attenuation factor $\Delta_{USF}(j,n)$ is used to attenuate the Mode A maximum transmit power value (i.e., BCCH level−P0 dB).

Power control parameters are also updated for the intended recipient of the downlink block (step 1215), and the downlink block is then transmitted at the specified power level, i.e. at the Mode A maximum transmit power value BCCH level−P0 dB attenuated by the calculated attenuation factor $\Delta(j,n_{curr})$ (step 1217).

Caching Uplink TBF Power Control History at the End of an Uplink TBF

Figure 13:
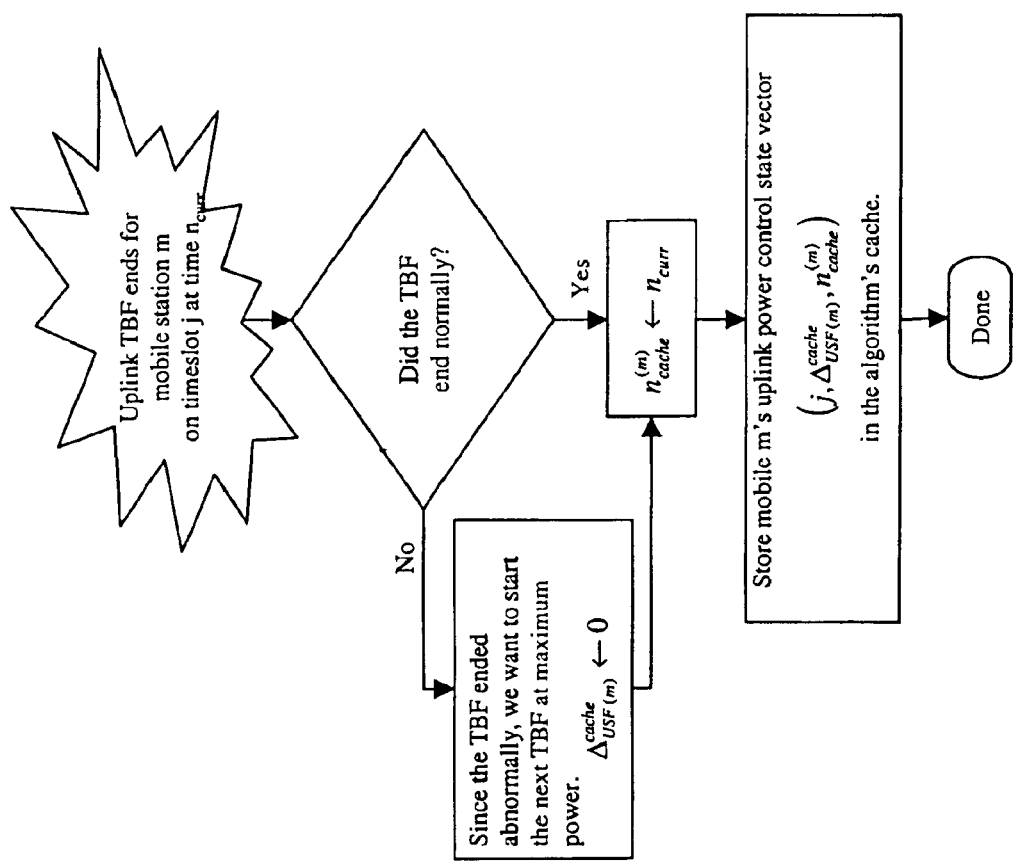
FIG. 13 is a flow chart illustrating the caching of USF flag performance history at the end of a mobile station's uplink TBF.

Referring now to FIG. 13, there is shown is a flow chart 1300 illustrating the caching of USF flag performance history at the end of a mobile station's uplink TBF. For each timeslot used in an uplink TBF, the algorithm records the values of $\Delta_{USF}(j,n)$ and the time the uplink TBF ended. These values may be cached in memory 113 by processor 111 running power control application 112, which implements the power control algorithm of the present invention. If subsequent uplink TBFs are initiated for the mobile, these cached values are used in the USF flag attenuation level update procedure, as shown in steps 1107, 1108 of FIG. 11.

Although the downlink power control method of the present invention has been described with respect to a GPRS system, in alternative embodiments, the method of the present invention may be employed in other wireless packet data networks, such as EGPRS (enhanced GPRS) networks.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. In a system having a base station transmitter for transmitting data blocks to one or more mobile stations over a radio link, a method for determining a transmit power level at which to transmit a current block, comprising the steps of:

(a) receiving a quality measurement from a mobile station indicating an average radio link quality over a given measurement interval for a previous group of blocks, wherein not all of the blocks of the previous group of blocks were necessarily transmitted at the same transmit power level;

(b) determining a transmit power attenuation level for each current block of a subsequent group of blocks as a function of a minimum of a first attenuation factor and a second attenuation factor, based in part on the received quality measurement over the given measurement interval; and (c) for each current block of the subsequent group, subtracting the transmit power attenuation level from a given transmit power level used for transmitting one or more of the blocks of the previous group to determine the transmit power level for that current block.

2. The method of claim 1, wherein the system is a general packet radio service (GPRS) system.

3. The method of claim 2, wherein the system has Mode A and Mode B power control modes, and the given transmit power level is a Mode A maximum transmit power level.

4. The method of claim 3, wherein the Mode A maximum transmit power level is a broadcast common control channel transmit power level minus a P0 power level assigned to the mobile station during establishment of a downlink temporary block flow (TBF).

5. The method of claim 1, wherein:
the current block is to be transmitted on timeslot j; and
the quality measurement indicates the average radio link quality over the previous group of blocks also transmitted on timeslot j.

6. The method of claim 1, further comprising transmitting the current block at the transmit power level.

7. The method of claim 1, wherein step (a) further includes, during transmission of a last block of the previous group of blocks, polling the mobile station for the quality measurement by setting a poll bit in the last block.

8. The method of claim 1, wherein:
a current block of the subsequent group is to be transmitted on timeslot j at time n;
the quality measurement indicates the average radio link quality over the previous group of blocks also transmitted on timeslot j, and
step (b) further includes, for each current block of the subsequent group:
(1) calculating the first attenuation factor, the calculated first attenuation factor represented as a radio link attenuation level indicating the downlink attenuation level the mobile station can tolerate while still achieving an acceptable bit error rate;
(2) calculating the second attenuation factor, the second attenuation factor represented as an uplink control flag attenuation level indicating the estimated additional downlink attenuation that can be applied such that adequate uplink state flag (USF) performance is achieved; and
(3) determining the transmit power attenuation level by taking the minimum of the radio link attenuation level and the uplink control flag.

9. The method of claim 8, wherein:
step (b)(2) includes setting the uplink control flag attenuation level to a maximum attenuation level, if there are no active uplink temporary block flows (TBFs) on timeslot j.

10. The method of claim 9, wherein the radio link attenuation level is determined in accordance with an optimal radio link attenuation level and an effective attenuation level.

11. The method of claim 10, wherein:

the effective attenuation level is determined based on a fraction of blocks sent at a given attenuation level to the mobile station over the given measurement interval;

the optimal radio link attenuation level is estimated based on a target bit error rate for the mobile station, a mean BER experienced by the mobile station and the effective attenuation level; and the radio link attenuation level is determined based on the effective attenuation level and a confidence factor representing the confidence is the estimated optimal radio link attenuation level.

12. The method of claim 10, further comprising:

caching, at the end of a downlink TBF for the mobile station, the radio link attenuation level and the time that the radio link attenuation level was last updated;

at the beginning of the next TBF for the mobile station, retrieving said cached information and decreasing the cached radio link attenuation level to account for elapsed time; and setting an initial radio link attenuation level for said next TBF in accordance with said cached radio link attenuation level.

13. The method of claim 8, wherein step (b)(2) includes incrementing the uplink control flag attenuation level if, in a specified previous number of blocks, there have been no new uplink TBFs and no USF flag errors and no changes in the uplink control flag attenuation level.

14. A method for determining a transmit power level for each block of a group of blocks to be transmitted to a mobile station, comprising:

calculating, based on measurements of a previous group of blocks reported by the mobile station over a given measurement interval, a first attenuation factor indicating a downlink attenuation level the mobile station can tolerate while still achieving an acceptable bit error rate;

calculating a second attenuation factor indicating an estimated additional downlink attenuation to be applied to the first attenuation factor; and determining the transmit power attenuation level by taking the minimum of the first and second attenuation factors.

15. The method of claim 14, wherein the first attenuation factor is a radio link attenuation level in the downlink the mobile station can tolerate while still achieving the acceptable bit error rate; and the second attenuation factor is an uplink control flag attenuation level indicating the estimated additional downlink attenuation to be applied to achieve adequate uplink state flag (USF) performance.

16. The method of claim 15, wherein each block of the group is to be transmitted on a timeslot j at a time n, and calculating the second attenuation factor includes setting the uplink control flag attenuation level to a maximum attenuation level, if there are no active uplink temporary block flows (TBFs) on timeslot j.

17. The method of claim 15, wherein calculating the first attenuation factor further includes determining the radio link attenuation level based on an effective attenuation level and an optimal radio link attenuation level, the effective attenuation level being determined based on a fraction of blocks sent at a given attenuation level to the mobile station over the given measurement interval, the optimal radio link attenuation level being estimated based on a target bit error rate for the mobile station, a mean BER experienced by the mobile station and the effective attenuation level.

18. The method of claim 17, wherein the radio link attenuation level is determined based on the effective attenuation level and a confidence factor representing confidence in the estimated optimal radio link attenuation level.

19. A method by which a base station determines a transmit power level for transmitting each block of a group of blocks in the downlink, comprising:

receiving, from a mobile station, a measurement report for a previous group of blocks over a given measurement interval;

calculating, for each current block of a subsequent group of blocks to be transmitted, compensations to be made to transmit power level for each current block as a function of a minimum of two attenuation levels; and transmitting each block based on the minimum of the two attenuation levels.

20. The method of claim 19, wherein, determining a first attenuation level of the two attenuation levels, the first attenuation level representing a maximum attenuation level required to meet adequate uplink state flag (USF) performance; and determining a second attenuation level of the two attenuation levels, the second attenuation level representing a maximum attenuation level used so that the mobile station receiving data sees suitable error rate performance.

21. The method of claim 20, wherein determining the second attenuation level includes determining the second attenuation level based on a quality measurement reported by the mobile station.

22. The method of claim 20, wherein determining the second attenuation level includes determining the second attenuation level based on a desired link quality for the base station for downlink transmission.

23. The method of claim 20, wherein determining the second attenuation level includes estimating an optimal second attenuation level based on different power levels used to transmit a particular block of a previous group of blocks over the measurement interval.

24. The method of claim 23 wherein said estimating includes using a compensation factor that compensates for different power levels used to transmit a particular block over the measurement interval.

25. The method of claim 23, wherein determining the second attenuation level includes determining the second attenuation level based on a factor which quantifies a confidence in the optimal second attenuation level estimate, the factor based on one of the different transmit power levels used for transmitting the previous group of blocks over the given measurement interval, and whether the estimated optimal second attenuation level indicates that transmit power should be increased or decreased.

* * * * *